United States Patent
Chawla et al.

(10) Patent No.: US 12,235,882 B1
(45) Date of Patent: Feb. 25, 2025

(54) CONTROLLING EXECUTION OF ARTIFICIAL INTELLIGENCE PIPELINES FOR DATA RETRIEVAL THROUGH CLIENT APPLICATIONS

(71) Applicant: Airia LLC, Alpharetta, GA (US)

(72) Inventors: Ravish Chawla, Atlanta, GA (US); Roman Fedoruk, Cumming, GA (US); John Manton, Cumming, GA (US); Spencer Reagan, Marietta, GA (US); Gregory Roberts, Dunwoody, GA (US); Erich Stuntebeck, Alpharetta, GA (US)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 18/920,411

(22) Filed: Oct. 18, 2024

Related U.S. Application Data

(60) Provisional application No. 63/648,162, filed on May 15, 2024.

(51) Int. Cl.
*G06F 16/33* (2019.01)
*G06F 16/28* (2019.01)
*G06F 16/334* (2025.01)
*G06F 16/338* (2019.01)

(52) U.S. Cl.
CPC ........ *G06F 16/3347* (2019.01); *G06F 16/285* (2019.01); *G06F 16/338* (2019.01)

(58) Field of Classification Search
CPC .................................................. G06F 16/3347
See application file for complete search history.

(56) References Cited

U.S. PATENT DOCUMENTS

2022/0036232 A1* 2/2022 Patel ......................... G06F 8/71

* cited by examiner

*Primary Examiner* — Van H Oberly
(74) *Attorney, Agent, or Firm* — Clayton, McKay, & Bailey, PC

(57) ABSTRACT

Systems and methods are described for a managed multidimensional search based on an application query and management policies. The application can receive a pipeline endpoint. The query can be sent to the pipeline endpoint. The pipeline can vectorize the query for comparison against a vector database of an identified dataset. The closest vectors can be converted back to content chunks. The system can generate prompts related to the content chunks and send those prompts to an AI model. The AI model can then output a response that includes the most relevant content, citations, and hyperlinks. These can be displayed in the application.

20 Claims, 19 Drawing Sheets

CONTROLLING EXECUTION OF ARTIFICIAL INTELLIGENCE PIPELINES FOR DATA RETRIEVAL THROUGH CLIENT APPLICATIONS

CROSS-REFERENCE TO RELATED APPLICATIONS

This application claims priority as a non-provisional application to U.S. provisional application No. 63/648,162, titled "Managed Artificial Intelligence Pipelines for Multi-dimensional Searches," filed May 15, 2024, which is incorporated herein in its entirety.

BACKGROUND

Searching within documents has long been limited to simple text searching. A user selects a search feature, enters one or more words, and those words are highlighted within the document.

However, when searching through some materials, the user might not know the best words to use in finding the desired subject matter. As an example, searching the Federal regulations for the term "bottle to throttle" returns no results. This is true despite pilots commonly using the term when discussing how long they need to wait after drinking before attempting to pilot an aircraft. When the user gets no results, they are left to look to a different source or attempt to perform a new search. A user might not know which dataset to search, and keyword searching across datasets can be even more hit and miss in terms of relevant results. Some will not have time to find the information they were looking for.

Artificial intelligence ("AI"), and particularly large language models ("LLMs"), are also used to answer common questions. However, they are not readily available for use within many applications. For example, the user might need to stop using an application where they are searching for information, and instead start a separate session with an LLM outside of the application. Additionally, the user does not know if the LLM was trained on the specific data source being searched. If the data source is a private enterprise document store, then the LLM will not have knowledge of those documents. Even when the LLM is trained on a relevant data source, the user cannot be confident in the LLM's results, particularly regarding specific documents and regulations. The LLM may have trained on a dated dataset, such as an older version of the data, which can cause the LLM to return dated or incorrect results. The user might also spend a lot of time attempting to prompt the LLM in ways that yield useful information. Finally, the results might be returned in the separate LLM session rather than in the application where the user wanted to search to begin with.

As a result, a need exists for more robust searching methods that leverage AI within applications, rather than relying on text searches within those applications.

SUMMARY

Examples described herein include systems and methods for multidimensional searching within an application based on a semantic meaning of a content query. An application can rely on one or more managed AI pipelines that generate additional search context and allow the application to display results that are contextually related to the search criteria.

The application can receive an AI pipeline endpoint and an AI endpoint key from an AI platform. The endpoint can be a uniform resource locator ("URL") for an AI pipeline that resides on the user device or remotely, such as in the cloud. The AI pipeline can be designed and made available by an AI platform, in an example. The key can be used as part of accessing the AI pipeline. The AI platform or an associated management server can transmit different AI endpoint keys to different users, depending on which default AI pipeline should apply to that user. This can be based on the application or application version. When the user performs a search within the application, the content query is sent to the AI pipeline at the endpoint, along with the key. An AI pipeline execution engine (also called a "pipeline engine" throughout) can use the AI endpoint key to authenticate the user and identify which AI pipeline or AI pipeline objects apply to the content query (or other type of AI pipeline input).

In one example, a pipeline engine executing at the endpoint identifies a dataset associated with the query. The term dataset is synonymous with the term data source. The dataset can be chosen by default in association with the application. The dataset can be identified based on prior user selection or can be identified in part based on an object selection rule, which can require satisfaction of one or more management policies, such as a dataset policy. An embedding model can vectorize the content query and also produce query metadata. The vectorized content query can be compared against an existing vector database for the dataset. The same embedding model and parameters used to create the vector database from the dataset can be used again to vectorize the query. The vector database can include metadata that maps the vectors to corresponding data chunks of the dataset. By comparing the query vectors and metadata against the database vectors and metadata, a number of similar vectors can be identified. These represent semantic similarities. The system can identify the dataset content chunks that correlate to those similar vectors.

The AI pipeline execution engine can then identify an AI service, which can execute or even be synonymous with an AI model (such as an LLM), for further manipulating and formatting the data chunks associated with the query. This identification can be based on user profile information and management policies. The system can also generate prompts for use with the AI service. These prompts can take into account the identified dataset content chunks, enterprise prompts, and a prompt policy. The prompts, chunks, corresponding metadata, and content query can be sent to the AI service. The AI service can be prompted to do things like prioritize the most relevant chunks based on context, identify citations within the chunks and replace them with hyperlinks, and otherwise format the response for use in the application. The response can be post-processed by the pipeline engine, and then sent to the application. The application can then display the response, such as a list of search results with hyperlinks to relevant sections of the dataset.

In another example, the pipeline sends the query to an AI service to determine a semantic meaning, prior to vectorization. The AI service, such as an LLM, can identify additional keywords to append to the query or to use in place of the query. The prompts causing the LLM to do so can be based on the identified dataset, enterprise prompts, and the query itself. This can create a super content query that is then vectorized using the same embedding model that created the vector database for the identified dataset. The vectorized super content query can be compared to the vector database, and chunks corresponding to the most similar vectors in the database can be utilized as part of a response. The response can then be post-processed and displayed in the application. The post-processing can include sending the chunks again to an LLM or other AI model and processing the output.

The pipeline can also dynamically alter which AI service is used, which pipeline stages are executed, and which prompts are supplied based on prior results of the pipeline. For example, if less than a minimum number of content chunks are identified, a prompt package seeking similar content from the dataset can be sent to the AI service. As another example, if a combination of pipeline stages is taking too long to execute, alternate faster (but potentially less accurate) approaches can be taken for particular stages or the pipeline as a whole.

Metadata associated with the identified chunks can also be used by the system to prepare results for display at the application. For example, the metadata can identify where in a document the chunk came from. The AI service or code executing as part of the pipeline can generate hyperlinks that act as citations to the relevant document locations. Additionally, metadata can be used to indicate permissions for access and authorization purposes and can be appended to the chunks at the time of creation. This can allow the system to manage display of data chunks in a way that complies with various management policies. The metadata can even be used to bypass vector searching in the chunk retrieval process when the same query has already been executed recently, based on cached data.

In one example, the application can determine whether the user device is offline and use a localized pipeline endpoint in that event. Some or all of a vector database for a dataset can exist locally on the user device. Additionally, the local pipeline can utilize a local embedding model and AI model such that the dynamic search can still occur without internet access. Conversely, if the user device is online, a different pipeline with remote components can be executed.

The identified dataset can be one of multiple datasets searchable within the application. The query can indicate which dataset to search, or multiple datasets can be searched as part of a single pipeline.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1A:
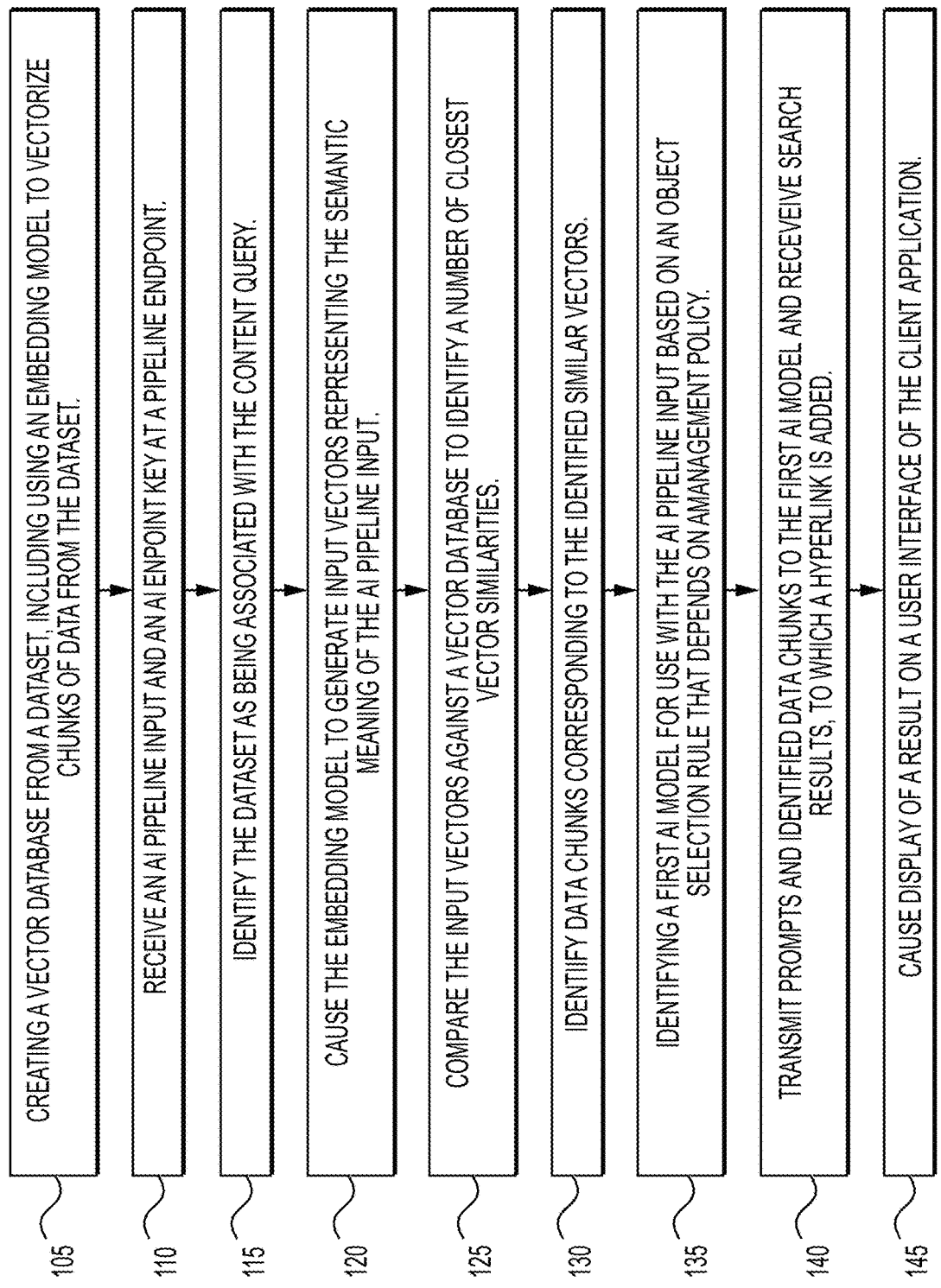
FIG. 1A is a flowchart of an example method for multidimensional searching within an application through use of managed AI systems.

Reference will now be made in detail to the present examples, including examples illustrated in the accompanying drawings. Wherever possible, the same reference numbers will be used throughout the drawings to refer to the same or like parts.

Systems and methods are described for multidimensional searching a dataset within an application. An AI platform can instantiate a dataset by generating chunks of the dataset according to a chunking policy. An embedding model can convert those chunks into a vector database. The vector database can include vectors with embedded metadata. The metadata can be used to retrieve prior results and to enforce management policies on specific data chunks. The AI platform can also instantiate a pipeline that can define how the multidimensional search will execute. The pipeline stages can be conditional and dynamic. An application that is enrolled with the platform can receive a pipeline endpoint and a key for a pipeline that is ready to execute.

The application can include a graphical user interface ("GUI") that allows a user to input a query. For example, the query can include user input in a search field. The query can be sent to the endpoint, which can be a URL, along with the key received from the platform. The endpoint can be an access point for a pipeline that executes locally on the user device, on a network, or in the cloud. It is possible for a pipeline to execute both locally and on a network.

The pipeline can identify a dataset associated with the query. The query can be turned into chunks that are vectorized by the same embedding model that vectorized the identified dataset. The embedding model can determine a semantic meaning of the query and output an array of vectors that represent that meaning. The pipeline engine can then compare the vectorized query and metadata against the vector database of the dataset and identify a number of most similar vectors. The vectors of the vector database can include metadata, such as information describing which content chunks, files, sections, and privileges correspond to the vectors. This metadata can be applied at the time of vectorization by the embedding model, or later based on management policies at the platform. The pipeline engine can identify corresponding chunks for the identified vectors, along with corresponding metadata.

The pipeline engine can also identify an AI service, such as an LLM, for further manipulation of the query. Potential AI services include Bidirectional Encoder Representations from Transformers models, Generative Pre-trained Transformer models, embedding models, information retrieval models, neural search models, transformer-based models, retrieval-augmented generation models, conversational AI models, image recognition models, and others.

The AI service can be identified based on management policies, identify of the user, and the user device. The pipeline engine can generate prompts for the AI service based on the identified dataset, the identified content chunks, and the query. The prompts are submitted to the AI service. For example, the AI service may be tasked with returning the four most relevant results for display, even though thirty chunks are provided. The pipeline engine receives a response from the AI service, which can then be post-processed. For example, hyperlinks can be added to text based on the metadata. The processed results are then sent to the application, which displays the results in a GUI.

FIG. 1A is a flowchart of an example method for multi-dimensional searching within an application through use of managed AI systems. At stage 105, an AI platform instantiates a dataset that can be used in the searching. The dataset can be one or more documents, files, or a database. The AI platform can execute in the cloud, on one or more servers.

Instantiating the dataset can include creating a vector database for the dataset through use of an embedding model. The embedding model can be selected by a user or by the platform itself. For example, a default embedding model and chunking parameters can be set according to management policies, such as dataset policies and enterprise policies. Dataset policies can specify selection criteria that are used to determine which parts of the data are relevant and should be transformed into vectors. Dataset policies can include chunking policies, which can guide how to segment the data into manageable chunks. Through policies or user selection, the chunks can be set for natural divisions in text, such as sentences and paragraphs, fixed-sized chunks, or some combination of both. While smaller chunks can require longer search times, they can also be vectorized more accurately in some situations.

The embedding model can be selected to suit the characteristics of the dataset and the application that interacts with the dataset. The embedding model can be a user selection or part of the dataset policy. Different embedding models can determine semantic meaning of different types of data. For example, an embedding model trained for aeronautical information can create vectors of the Federal Aviation Regulations with closer semantic meaning than an embedding model trained for music history or for some other type of data, such as images. Additionally, dimensionality can be selected to determine the size of the vector embeddings. Higher dimensions can capture more detail but require more storage and computational resources when searching.

Indexing can also be applied to the vectors for searching purposes. Example indexing techniques include hash-based indexing, tree-based indexing, cluster-based indexing, and graph-based indexing.

Additional security and compliance policies can cause the redaction, encryption, or other anonymization of some types of data. Additionally, security metadata can be generated with the chunks to ensure that a user can only retrieve chunks that they are authorized to see according to their own user policy or an enterprise policy. In one example, chunks with redacted information can be available to users without authorization to see the full data.

Sets of these policies and chunking parameters can be grouped together as chunking strategies for selection by an administrative user of the platform, in an example. At stage 105, the dataset can be split into chunks of data according to the aforementioned policies and parameters. Each chunk can be vectorized using the selected embedding model. This can result in a database of vectors and metadata. The metadata can track which chunks, documents, and sections that the vectors correspond to. Additionally, the metadata can include security information that allows for management of access to the vectors or corresponding chunks. The vector database for the initialized dataset can be stored in the cloud in an example. Alternatively, the vector database or some portion of it can be sent to a user device for local storage.

At stage 110, the user device receives a pipeline endpoint and a key. The user device can be any processor-enabled device, such as a phone, tablet, headset, laptop, or personal computer. The endpoint includes a URL that designates a location to send a query and the key for beginning the pipeline functionality. The location can be local on the user device. Local pipeline execution can be monitored by an agent that executes on the user device, in an example. Alternatively, the URL can specify a remote location where the pipeline executes, such as in the cloud.

The user device can receive a query within the application. For example, an application that allows pilots to quickly locate information in the Federal Aviation Regulations or Aeronautical Information Manual can include a search bar. The user can select the search bar, then input search keywords or a phrase. Alternatively, the query can come from a separate application.

The application itself can be configured to use an application programming interface ("API") or software development kit ("SDK") for formatting and sending the query to the endpoint. The API and SDK can also define the format of the results that the application will receive. The query can be sent along with the key, which is used to authenticate the query at the endpoint. Other information, such as user profile information used for management purposes, can be included with the query or separately sent to the pipeline engine. The pipeline engine can monitor communications at the endpoint and initiate the pipeline for the user device when a query and the key are received. The pipeline engine can execute locally on a user device or as a distributed service in the cloud. The pipeline engine can include orchestrator functionality for initiating, monitoring, and controlling pipeline activities. The pipeline engine can also include policy enforcement functionality for applying various management policies as part of the pipeline execution. Likewise, pre-processing, dependency queuing, and post-processing can all be part of the pipeline engine execution.

The pre-processing can include using an LLM or other AI model to check for various risks. For example, the pre-processing can act as a prompt shield to protect against jailbreak attacks or other indirect attacks. This can guard against malicious users who would attempt to get a backend AI model to bypass desired behaviors set by developers or by an administrative user. Indirect prompt attacks can include potential vulnerabilities where third parties place malicious instructions inside of documents that the AI system can access sand process.

The pipeline itself can be designed at the AI platform to include various steps. These steps can execute in parallel or in series, depending on the pipeline design. The steps can include identifying a dataset, identifying an AI service, and various pre- and post-processing. An administrative user can design and deploy the pipeline using a GUI that can be part of the AI platform.

At stage 115, the pipeline engine can identify the dataset associated with the query. This information can be part of the query itself in an example. If the application has capabilities to search multiple different datasets, then the query can indicate which ones are applicable. A default dataset can be used with particular applications.

The pipeline engine can also determine whether the user is authorized to access the dataset. This can be based on user policies and device policies compared to dataset policies, such as security information for the dataset. For example, a paid user can have higher access credentials than a free user in an example. Alternatively, in an enterprise, the employee can belong to one or more groups that have differing access credentials. For example, an executive might be authorized to access confidential corporate documents that a receptionist is not allowed to access. The dataset policy might only allow access to the dataset when the query comes from a particular application, in an example. The pipeline engine can enforce these policies in identifying the dataset that will be used in the pipeline. The pipeline engine can determine whether access to the dataset is authorized for a user submitting the content query. In one example, a default dataset exists for use when management policies prevent the user from using a preferred dataset.

At stage 120, the pipeline engine can identify the semantic meaning of the content query. This can be done by vectorizing the content query using the embedding model associated with the identified dataset. (Alternatively, an LLM can be used prior to the vectorization to retrieve a semantic meaning and/or related search keywords.) The pipeline engine generates content query vectors with the same embedding model that generates a vector database for the identified dataset. In general, the same embedding model is used so that the vectors of the content query will share the characteristics of those in the vector database of the dataset. In particular, the vectors will exist in the same dimensional space, allowing them to be comparable in terms of semantic meaning. This is because the vectors represent the semantic meaning of the respective chunk, with added dimensionality generally allowing for more nuance in the semantic meaning.

Embedding models are designed to capture the semantic meaning of chunks of words, such as phrases, sentences, or entire documents. These models work by transforming text into high-dimensional vectors that represent the text in a continuous vector space. The position of a vector within this space reflects its semantic properties relative to other vectors. The vector dimensionality can help with representing nuance in semantic meaning. Vectors are alternatively referred to as embeddings.

By analyzing large amounts of text data, embedding models learn to position semantically similar words closer together in the vector space. Models like Bidirectional Encoder Representations from Transformers ("BERT") and Generative Pre-trained Transformer ("GPT") consider the broader context in which words appear. These embedding models generate embeddings that reflect not only the meanings of individual words but also how those meanings change depending on the surrounding words. For example, the word "bank" can have different embeddings in "riverbank" versus "bank account."

For chunking larger segments of text, such as sentences or paragraphs, the embeddings of individual words can be aggregated using various methods. Simple methods might involve averaging the word vectors, while more sophisticated approaches could involve additional layers of neural networks that learn the best way to combine word vectors into a single embedding for the entire text chunk. Some models are designed to directly generate embeddings for longer chunks of text. For instance, sentence transformers are a variation of BERT that are optimized to produce embeddings directly for sentences or paragraphs, capturing the overall semantic meaning more effectively than merely aggregating word-level embeddings.

An administrative user can select embedding models and chunking parameters with the goal of semantically similar texts (regardless of their exact wording) resulting in embeddings that are close to each other in the vector space. This can help identify texts with related meanings.

At stage 125, the pipeline engine can compare the query vectors output from the embedding model against the vector database of the identified dataset. This can allow for finding content chunks of the dataset that share a similar semantic meaning to the query itself. To identify similar vectors (i.e., those with similar semantic meaning), the distance between the vectors can be determined. The closer the two vectors, the closer in meaning they are. In one example, vectors of the vector database that have a threshold similarity to the content query vectors are identified as similar. The threshold similarity can be a distance value, with vectors of less distance than that threshold being counted as similar. The distance is measured within the embedding space, which again can have different dimensionality depending on policies and user selections.

One way to assess the similarities in semantic meanings between vectors is through cosign similarity. This measures the cosine of the angle between two vectors. The result can be normalized, such as with −1 representing exact opposites, 1 representing exact sameness, and 0 indicating no similarity. Other measurement methods are also possible, such as straight-line distance between two vectors. Sets of vectors can also be measured together, such as by analyzing the size of intersection between sets and the size of union between sets.

To facilitate the search and comparison, the vector database can be indexed. Vectors can be organized according to closeness to one another, in an example.

By comparing the query vectors to the vectors of the vector database, a semantic search can be performed based on the query. An endpoint policy can specify a maximum number of vectors to identify based on the threshold similarity. In one example, the identified vectors are ranked according to similarity and only the maximum number are retained.

At stage 130, the chunks are retrieved that correspond to the identified similar vectors. The vectors can be embedded with metadata that allows the pipeline engine to locate the corresponding chunks. This metadata can include identifiers, source information, timestamps, privileges, and other relevant details. Again, the chunks can include the text or other information that was transformed into vectors by the embedding model.

At stage 135, the pipeline engine can identify a first AI service for use with the query. This AI service can be a default setting for the pipeline. But the AI service can also be identified based on the dataset and management policies. For example, some LLMs are more expensive to use than others. A paid user might have access to a more expensive LLM than a free user. Likewise, an executive might have access to a more expensive LLM than a sales employee. These permissions can be stored as part of an AI pipeline management profile, which can include various management policies, such as a device policy and/or an AI model policy. The AI pipeline management profile can be sent to the pipeline engine for enforcement during AI pipeline execution. The device policy might only allow a fixed number of uses of a particular LLM per time period. Similarly, the AI model policy might only allow a maximum total number of uses in the time period across all devices for an enterprise. This can allow organizations to control costs related to paid AI models.

The user may need to be in compliance with particular management policies to use certain AI services. For example, the device might need to be within a geofenced area, such that different AI services are available when the user is at work versus at home. Additionally, for users on the move, such as pilots, different territories could have different access regulations for particular AI services. Therefore, management policies could help identify an AI service that is available and cost effective in the region.

AI services can vary depending on the specific pipeline deployed. Potential AI services include LLMs, such as a GPT model, and can allow for chat and conversation interaction, chat and conversation creation, code generation, journalistic content creation, question answering, etc. The AI services can be selected based on being trained to assist with specific topics or dataset types.

At stage 140, prompts are generated for use with the identified AI service. The prompts can guide how the AI service uses the supplied query, identified similar chunks, and other context. Prompts can be stored on the AI platform for use in the pipeline. These can be personal prompts that help shape results in accordance with a user's personal preferences. These can also be public prompts that are open source or otherwise available to the public. Other prompts can include licensed prompts that require a license to use. Enterprise prompts also can be specific to an enterprise. For example, an enterprise may want to minimize results that tend to cast the enterprise in a negative light.

The prompts generated can be based on the identified chunks, the query, the application, and prompt policies. As an example, if there are far more chunks than can be conveniently displayed in the application for a mobile device, the prompts can specify only the most relevant four chunks for preparation for display in the limited display space. The device type can drive a prompt regarding the number of results to prepare, for example. The prompts can also specify how much text to display so that the user can recognize the relevant search results. This can also be based on selections the user makes in the application.

The prompts can also be generated based on the application submitting the content query. For example, the application can expect a particular format for results. One or more prompts can be stored for guiding the language model in formatting the results accordingly. Therefore, generating the prompts can include retrieving the stored prompt. For example, a JSON format can be specified in a prompt with different fields being populated by the language model. In addition, the user selection can guide prompt generation because different datasets can include different formatting requirements. For example, the application can allow the user to select different datasets for searching, with each dataset having different formatting requirements for display within the application. The language model can format the chunk text differently for the different datasets, such as by indicating a section versus a page number or quoting a rule versus summarizing a paragraph. The generated prompts can dictate which of the formatting decisions the language model makes, and the prompts can be selected as part of the prompt generation based on which dataset the user selected within the application. In another example, a dataset search is a different selection than a general query that the user can submit through the application. This selection can drive prompt generation for purposes of formatting results in a manner expected by the application.

The pipeline engine can transmit the generated prompts to the AI service. The prompts can be formatted in a way that the AI service understands, such as through use of an API for the AI service.

At stage 145, the pipeline engine can receive results from the AI service. Those results can be further processed, such as by adding annotations or hyperlinks to relevant documents and sections. This can alternatively be done by the AI service, in an example. The processed results can then be sent to the application for display in the GUI.

Figure 1B:
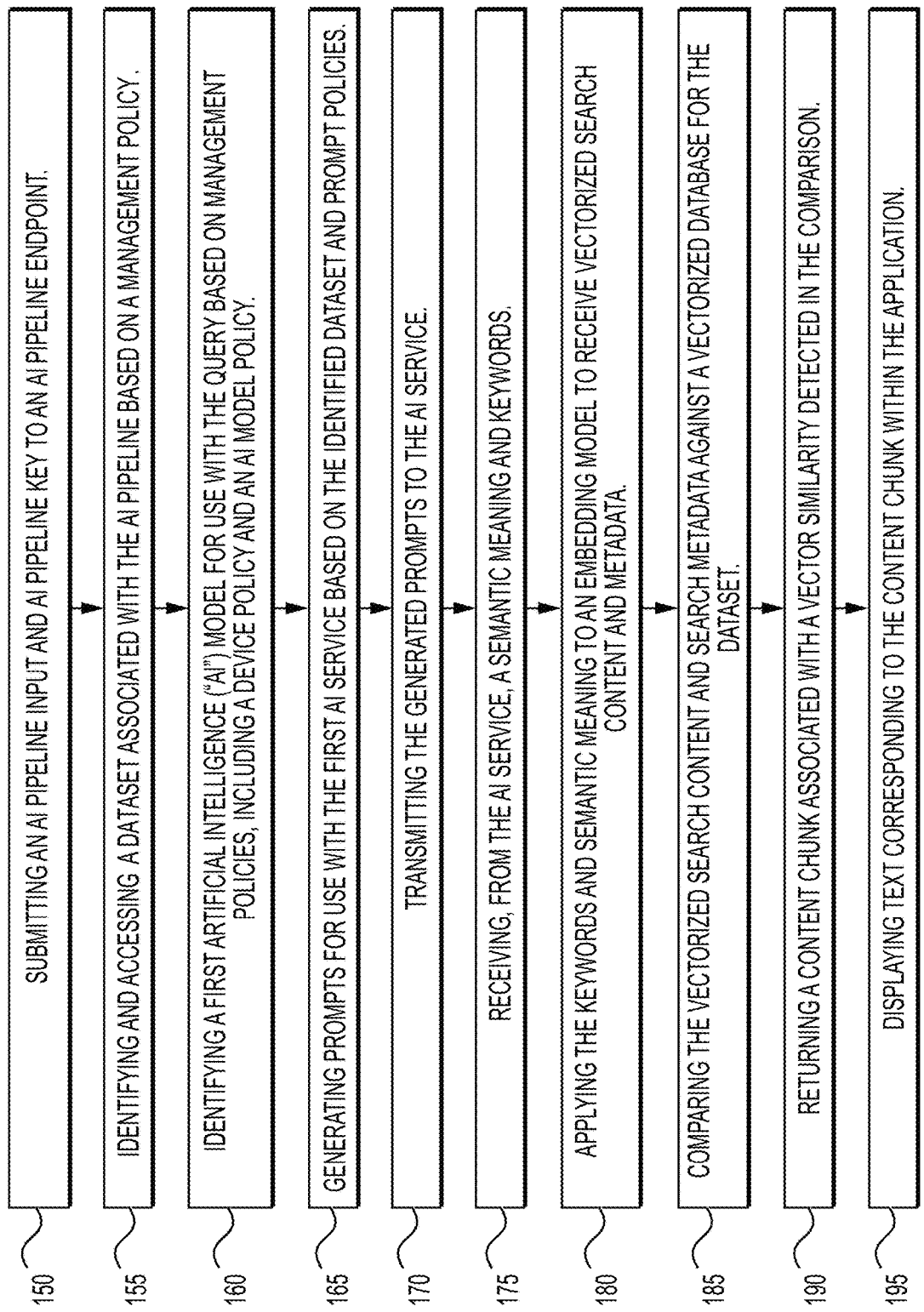
FIG. 1B is a flowchart of an example method for multidimensional searching within an application through use of managed AI systems.

FIG. 1B is a flowchart of an example method for multi-dimensional searching within an application through use of managed AI systems. FIG. 1B differs from FIG. 1A primarily in that an AI service is utilized prior to vectorization of the query. Instead, the AI service suggests additional search terms that are then vectorized for comparison to vectors in the vector database of the identified dataset.

At stage 150, the user device receives an AI pipeline endpoint and an AI endpoint key (also called a "key" for convenience). The key can also be a certificate, token, password, digital signature, or some other authenticating credential. A cryptographic key from an asymmetric or public-private pair is also useable. As explained previously regarding stage 110, the pipeline endpoint comprises a location for executing a pipeline that aids with searching a dataset through use of an AI service. The AI service can execute an AI model.

The user device receives a content query within the application. The content query is one type of AI pipeline input. The application can execute on the user device and provide a search field or some analogous search functionality. The user can enter the query into the search field. The application can submit the content query to the pipeline endpoint, along with a key for verification purposes.

Depending on the implementation, the pipeline can execute locally on the user device or in the cloud. The AI pipeline can be conditional, such that execution location and even which pipeline object to execute can be determined based on management policies and the posture of the user or user device.

At stage 155, the pipeline engine can identify a dataset associated with the content query and a dataset policy. The dataset policy can restrict access to the dataset other than when the query comes from a particular application, in an example. The dataset can be identified based on which application contacts the AI pipeline endpoint. The endpoint itself can be associated with an AI pipeline meant for that specific application, in an example. Also, a selection at the application can determine which dataset to use. For example, the user can select which repository or document they want to search. That selection can be included with the AI pipeline input, and the pipeline engine can identify the associated dataset.

The pipeline engine can determine whether access to the dataset is authorized for a user submitting the content query. Authorization can be based on user credentials as compared to requirements in the dataset policy. For example, different user credentials are possible for when users are within different payment tiers for the application. Likewise, different user credentials are applied to different employees of an enterprise, such as based on which department the user is associated with.

At stage 160, the pipeline engine can identify a first AI service for use with the query. A policy enforcer of the pipeline engine can ensure the user complies with management policies required for using the first AI service. For example, a device policy can require that the user device be registered with a management system in an enterprise prior to accessing the AI service. Likewise, the device policy can limit how many times the device can use the AI service in a particular time period. An AI model policy can require certain user credentials for authorized use of the AI service. Additionally, the AI model policy can limit overall use of the AI service based on current spend amounts with the AI service.

The AI service can be a model, such as an LLM or embedding model. In the case of an embedding model, the pipeline engine can specify the same embedding model and parameters used to create the vector database of the identified dataset.

At stage 165, the pipeline engine can generate prompts for use with the first AI service. The prompts can be based on the identified dataset and prompt policies. For example, particular prompts can be included for a user associated with an enterprise. Additionally, the prompts can be specific to the dataset, based on the known characteristics of the dataset. For example, a prompt can request a statutory section included in the dataset if any such section appears relevant to the search query. This can help generate additional search terms for use in a multidimensional search of the dataset.

At stage 170, the pipeline engine can transmit the generated prompts to the AI service. The AI service can be located remotely and contacted using an API or SDK call in an example.

At stage 175, the pipeline engine receives a result from the AI service. The result can include additional key words for use in the multidimensional search. In general, these can be words that are semantically related to the query submitted by the application. An embedding model can return vectors with metadata indicating vector relationships to text. An LLM can return additional text that enhances the query.

At stage 180, additional key words can be vectorized with an embedding model. If the AI service identified at stage 160 was an embedding model, then this stage can be completed at stage 170.

At stage 185, the pipeline engine can compare the vectorized key words against a vectorized database for the dataset. As explained with regard to stage 125, this can include determining spatial differences between the query vectors and dataset vectors. Closer spatial differences indicate closer semantic meaning between the vectors. A maximum number of vectors can be identified as similar, such as ten, in an example. In that example, the ten most similar vectors are ranked and identified.

At stage 190, the pipeline engine can identify content chunks associated with identified similar vectors. These content chunks can then undergo post-processing. This can include sending them to another AI service, such as in stage 140 of FIG. 1A. Alternatively, the post-processing can be based on code that executes as part of the pipeline. This code can add hyperlinks or citations to relevant document portions based on the metadata embedded with the vectors.

The code used for post-processing can be selected and added to the pipeline during pipeline design by an administrative user of the AI platform. The code can include any supported programming language or script language. Examples include ActionScript, C, C #, C++, Clojure, ColdFusion, D, Dart, Delphi, Erlang, Go, Groovy, Haskell, Java, JavaScript, Kotlin, Lisp, MATLAB, Perl, PHP, PowerShell, Prolog, Python, R, Ruby, Rust, Scala, Smalltalk, and Swift.

Post-processing can also utilize metadata to enforce permissions structure and auditing. For example, the metadata can capture the user's identity and provide a basis for the authorization to a particular chunk. The metadata can include a timestamp of when the chunk was generated and the permissions for the chunk at that time. Likewise, the timestamp of the user's query access can be saved as part of audit logging. The post-processing can also add back in information that was redacted in pre-processing in an example, such as when the user credentials allow for access to the redacted information.

Hyperlinks and citations can also be added during the post-processing.

At stage 195, the application can display text corresponding to the content chunks that were most similar to the content query. Again, this can include hyperlinks to the relevant document portions. The chunks can be ordered and presented from most semantically similar to least.

Figure 2:
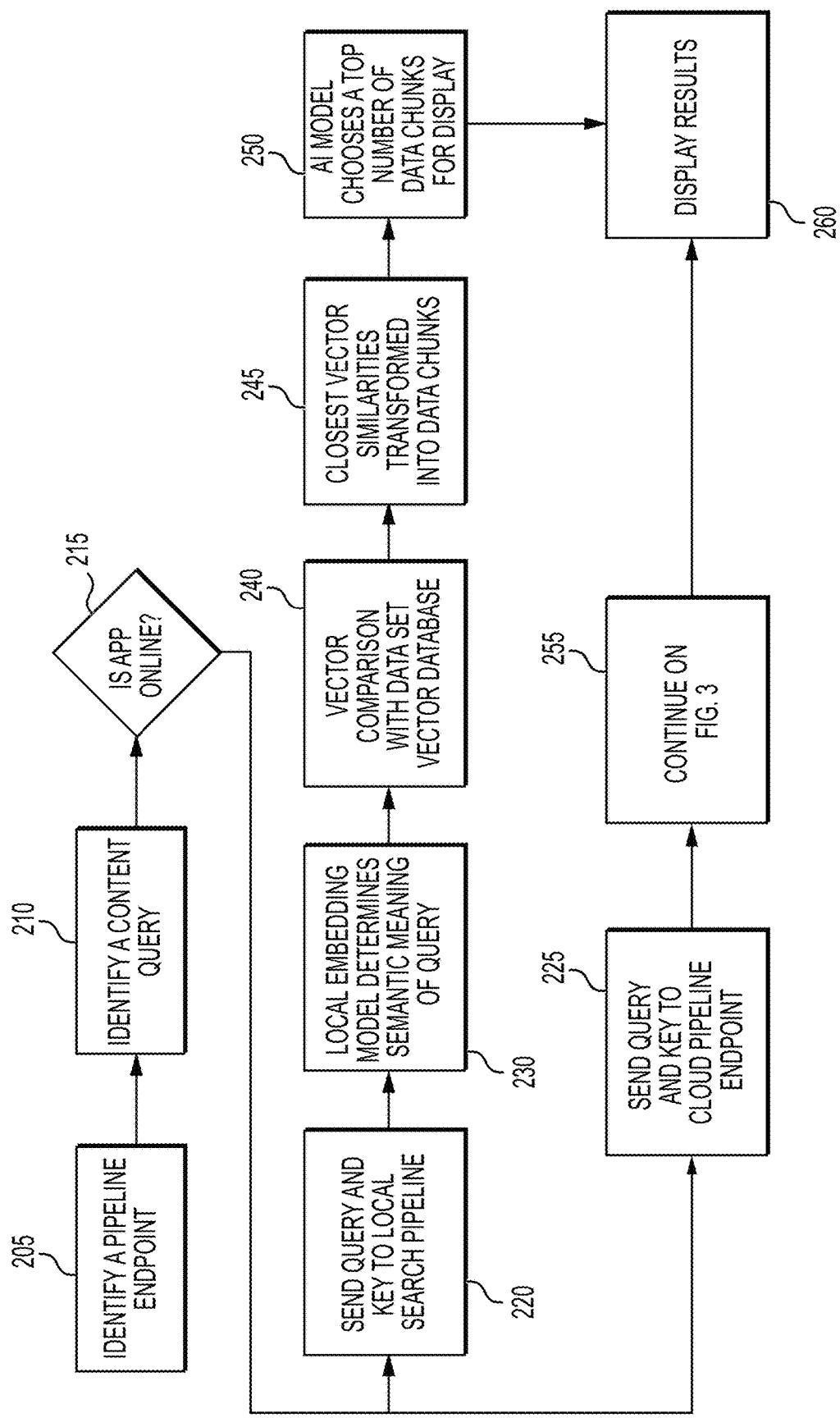
FIG. 2 is a flowchart of an example method for multidimensional searching within an application through use of managed AI systems.

FIG. 2 is a flowchart of an example method for multidimensional searching within an application through use of managed AI systems. Unlike the prior two flowcharts, FIG. 2 illustrates conditional pipelining based on whether the user device is online or offline.

At stage 205, the user device receives a pipeline endpoint. This can include a URL and a key. This endpoint can be received, for example, when the application is executing and the user device is online.

At stage 210, the user device can receive a content query. An application on the user device can allow the user to speak or type a query into a query field. The query can then be executed across one or more of multiple pipelines.

At stage 215, the application can determine whether the user device is online. This can include pinging or otherwise attempting to contact the pipeline endpoint. If the user device is offline, then the query can be sent to a local search pipeline at stage 220. This can be different than an online pipeline that is available at the pipeline endpoint. The online pipeline can have updated datasets and more robust access to AI services, in an example. This is because the online pipeline can contact third-party AI services as needed.

An agent executing on the user device can act as the pipeline engine for the local pipeline. This can include monitoring pipeline dependencies, such as linear versus parallel processes. It can also include policy enforcement, such as ensuring that the device is compliant with management policies before allowing access to certain local datasets.

At stage 230, the local pipeline can identify a local dataset that is subject to the query. Multiple local datasets can be searched, in an example. For each, a vector database can exist or be created on the fly using a local embedding model. In one example, the vector database and the embedding model are both sent to the user device previously when the user device is online. This allows for later offline usage.

The local embedding model can then vectorize the content query using the same parameters as those used in creating the vector database of the respective dataset.

At stage 240, the agent can perform a vector comparison between the vectorized content query and the vector database of the identified dataset. This can include picking a predefined number of top semantically similar results, ranked in order of most similar to least. Again, the most similar results are those that are spatially closest to the vectors of the content query.

At stage 245, the data chunks that correspond to the similar vectors can be retrieved. This includes using the metadata of the vectors to identify the corresponding data chunks.

At stage 250, a local AI model can be used to prepare the data chunks for display. This can include adding highlights, adding section headings to text, adding hyperlinks, and choosing which of the content chunks to display first based on context. For example, context about the user's role in an organization can be used to prioritize information that is pertinent to that role. The AI model can choose some subset of the chunks for display.

This functionality can be guided based on packages of prompts that can be stored locally and supplied to the AI model by the agent executing on the user device.

In another example, the AI model can choose between chunks returned from different pipelines. For example, if the user device is online, then at stage 225, a separate pipeline can execute. In one example, this pipeline can execute in a cloud and do so in parallel to the local pipeline of stage 220. The prompts for merging the sets of results can include prioritizing newer data, which can be determined by metadata timestamps for the vectors or chunks.

At stage 260, the application can display the results within a GUI that is presented on a screen of the user device.

Figure 3:
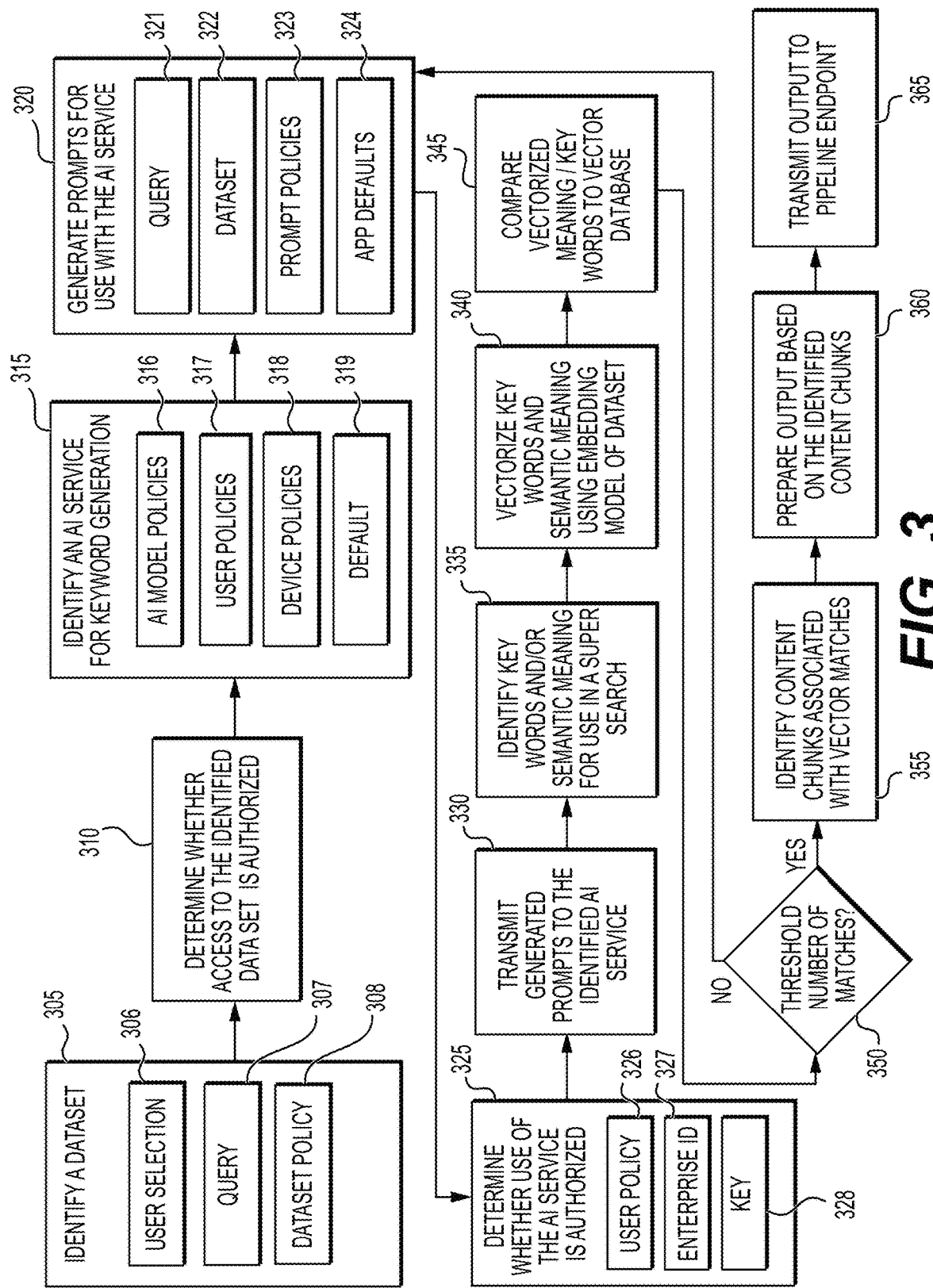
FIG. 3 is a flowchart of an example AI pipeline used for a multidimensional search.

In one example, if the user device is online, then the application sends the query and the key to the pipeline endpoint in the cloud. This online pipeline can take various forms and can execute instead of or in addition to the local pipeline at stage 220. One such possible pipeline, at stage 255, is shown in FIG. 3. The output of that pipeline can be post-processed and displayed in the application at 260. But as previously stated, an AI model can also merge results from the pipeline at stage 255 and one or more other pipelines, including the local search pipeline of stage 220.

FIG. 3 is a flowchart of an example AI pipeline used for a multidimensional search. This pipeline can execute in a cloud, at one or more servers, or even locally on a user device, depending on the implementation. In this example, an AI service is utilized prior to the vector comparison. However, in other examples, vector comparison can occur first, and the AI service can instead be used to manipulate the corresponding data chunks. In still other examples, AI services are used on both sides of the vector comparison.

At stage 305, the pipeline identifies a dataset. This can be based on user selection at stage 306. The selection can be done in the application in one example, such as by selecting which source of data to search. At stage 307, the query can also indicate which dataset to search. This can be deduced from the query language itself or based on information appended to the query by the application. The dataset can also be identified based on a dataset policy 308, which can specify which datasets are available to the user.

At stage 310, the pipeline engine can determine whether user access to the identified data set is authorized. This can be done by comparing the user privileges to the dataset policy in an example.

At stage 315, the pipeline engine can identify an AI service for use in the multidimensional search. The AI service can be an LLM or an embedding model, depending on the implementation. The AI service can be selected based on a default at stage 319. For example, a default AI service can be used unless other policies specify a higher-ranking AI service. Those other policies can include enforcement of AI model policies at stage 316, user policies at stage 317, and device policies at stage 318.

At stage 320, prompts are generated for use with the AI service. The prompts can relate to the query at stage 321, the dataset at stage 322, prompt policies at stage 323, and application defaults at stage 324.

At stage 325, the system can determine whether user of the AI service is authorized. This can be based on a user policy at stage 326, an enterprise identifier at stage 327, and the key itself at stage 328.

At stage 330, the prompts are transmitted to the AI service.

At stage 335, additional keywords and semantic meanings are received from the AI service.

At stage 340, the pipeline engine can use an embedding model to vectorize the key words and additional semantic meaning. The pipeline engine can use same embedding model and parameters as used to create the vector database for the identified dataset.

At stage 345, the pipeline engine can compare the vectorized key words and/or vectorized semantic meaning to the vectors of the vector database. The closest predefined number of vectors can be identified as semantically similar.

If there are not a threshold number of matches at stage 350, such as at least two, then the pipeline can generate different prompts at stage 320 to produce different keywords and semantic content. Otherwise, the pipeline can continue at stage 355, where chunks associated with the similar vectors are identified.

At stage 360, in post processing, the pipeline engine can prepare an output based on the identified content chunks. This can include adding hyperlinks or citations. In some cases, such as was described at stages 135 and 140 of FIG. 1A, the pipeline engine can identify another AI service and prompt packages for preparing an output based on the content chunks. The AI service can receive the chunks and return a new set of results based on the prompts. The new set of results can be in a format that is ready for display.

At stage 365, the output can be transmitted back to the application in the GUI. The pipeline engine can manage the return communications to the application in an example.

Figure 4:
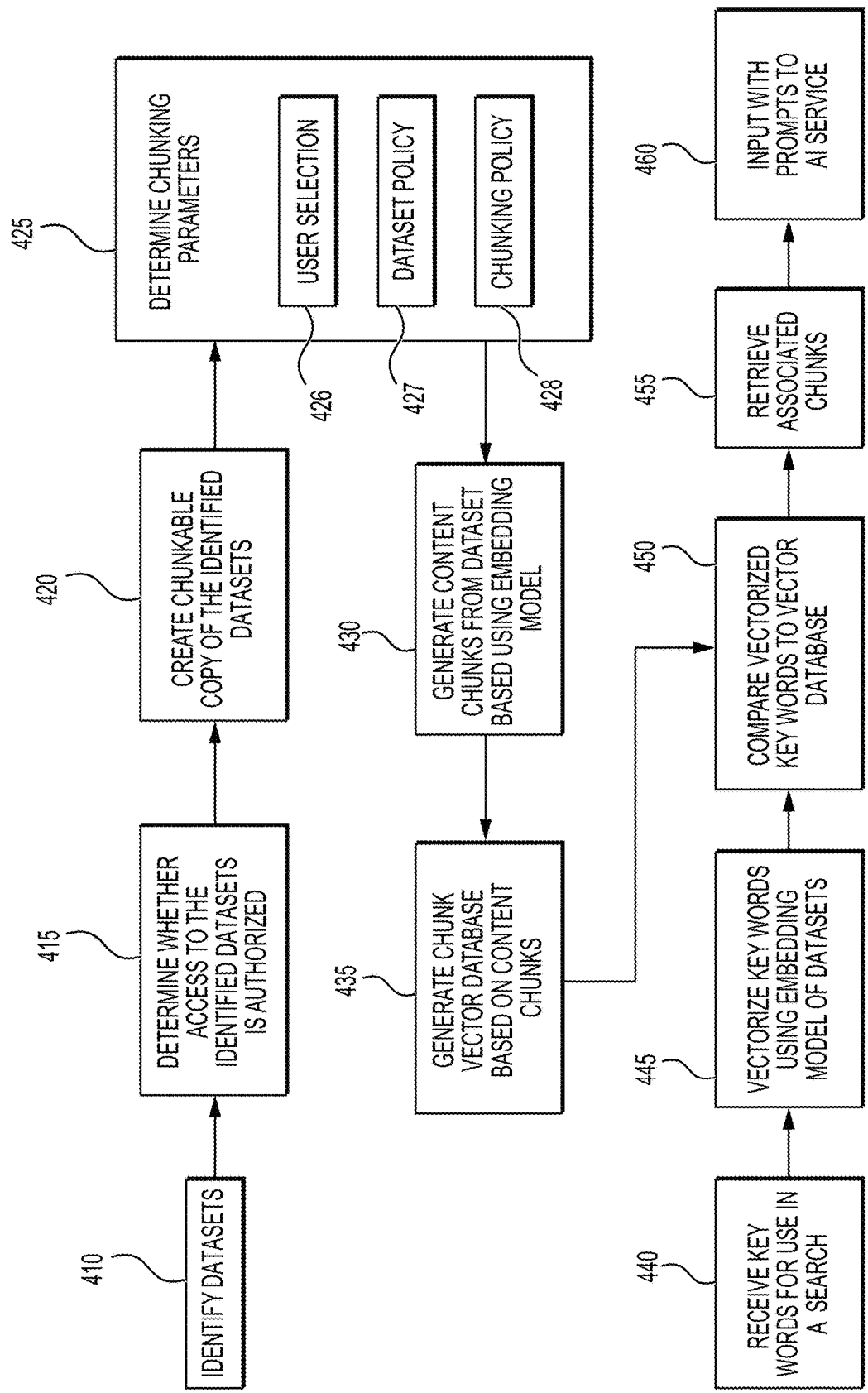
FIG. 4 is a flowchart of an example AI pipeline used for a multidimensional search.

FIG. 4 is a flowchart of an example AI pipeline used for a multidimensional search. FIG. 4 focuses on the instantiation of a dataset. In one example, this can be done prior to receiving a query for the dataset. In another example, the dataset can be instantiated in real-time based on receiving the query for the dataset. The instantiation can include preprocessing to ensure that parts of the dataset meet management policy requirements, and to remove potential attacks, such as malicious prompt instructions that can be embedded within the document. Management policies can cause the system to remove protected text or protected code. This can include analyzing chunks or pre-chunked datasets with an AI model that detects copyrighted content or source code that requires license information.

At stage 410, the pipeline engine can identify a dataset that is associated with the query. This can be based on the application explicitly identifying the dataset, such as by identifying a location of the dataset and/or a file name.

At stage 415, the pipeline engine can determine whether access to the identified dataset is authorized. This authorization can be based on the user making the request, the user's device, or other management policies as to whether the system itself can access the dataset. The management policies can include a pipeline policy regarding the size of the dataset, and whether the identified dataset is less than a maximum size. This is because huge datasets can be computationally intensive and time consuming, causing the platform to spend disproportionate resources on the dataset initiation or search. The user privileges can likewise indicate a maximum dataset size for instantiation based on the role or importance of the user to an organization. Likewise, different pay tiers of an application can warrant different sizes and types of datasets that are available for user search or initiation.

At stage 420, the platform can create a chunkable copy of the dataset. This can include creating data chunks based on chunking parameters. The chunking parameters define how the dataset is divided into manageable, meaningful chunks. For text datasets, the chunking parameters can relate to granularity on a sentence level, paragraph level, and document level. For example, each sentence can be treated as a chunk. Larger chunks such as paragraphs can capture more context. This can be useful for creating a searchable database where a broader understanding is important, such as in document classification or summarization. Entire documents can also be used as chunks when the overall theme or topic is the most important thing to be able to search. Chunks can also be based on specific word counts or topic boundaries. For example, headings, bullet points, and other structural elements can define beginnings and endings of chunks, while also incorporating a maximum word count to ensure that specificity is not lost.

Other datasets, such as image and audio data, can also be chunkable. For example, grids and sliding windows can be used for chunking image data. Time-based and feature-based chunking can be performed on audio.

At stage 425, the chunking can be based on chunking parameters determined by the platform. In one example, the chunking parameters can be based on user selection at stage 426. As an example, a user can select a setting representing what is the most important type of search, and the platform can apply the granularity to the chunking accordingly. The user can also make specific selections on the platform or in the application in an example. The application can transmit the chunking selections to the platform via API or SDK, in an example.

In one example, the user can create a new dataset database. This can include naming the data source, naming a container for the dataset, identifying a connection string for utilizing the dataset, selecting an embedding model, picking between a list of options for chunking strategy, setting a maximum chunk size, and adjusting an amount of chunk overlap. A GUI window that is part of the platform or the application can accommodate these selections.

Chunk settings can also be impacted by a dataset policy at stage 427. Dataset policies can impact practical chunk settings, for size and compute power reasons, such as by controlling the number of chunks to create for a dataset or the minimum size allowed. Dataset policies can also enforce legal and ethical considerations. For example, policies can relate to data privacy and can dictate how sensitive data is chunked and stored. For instance, removing or masking personally identifiable information ("PII") in text data could affect the granularity of chunking or require specific pre-processing before chunking. The policies can also include bias prevention or can make certain harmful content non-chunkable. This can result in some portions of a document being chunked while other more biased or harmful portions are not. To do this, the embedding model can attempt to understand which portions relate to a blacklisted topic, with a sensitivity threshold (based on vectorization) for removing chunks related to identified bias and harmful content.

A chunking policy at stage 428 can specify certain chunking parameters to ensure processing needs are met and to effect efficient storage and retrieval. The chunking policy can also require a particular set of approved embedding models. The set can be different for specific datatypes or sizes of datasets.

At stage 430, the platform can create content chunks from the dataset by using the chunking parameters defined in stage 425.

At stage 435, the platform can use an embedding model to create a vector database. The chunks created in stage 430 can be input into the embedding model, which outputs vectors and associated metadata. When the vector database is complete, the dataset is ready for searching.

At stage 440, the pipeline engine of the platform can receive a query, such as key words, for use in a search. In one example, the pipeline is not initiated until after the vector database for the dataset has been created at stage 435. However, in another example, the vector database is created in parallel to query requests received by the pipeline engine. In one example, the query request at stage 440 can even cause identification of the dataset at stage 410 and the creation of the corresponding vector database at stage 435.

At stage 445, the key words of the query can be vectorized using the same embedding model as is used on the dataset. Parameters impacting dimensionality of the vectors can likewise be kept the same to ensure a working semantic meaning between comparison between the query and the dataset vectors.

At stage 450, the platform can compare the vectorized keywords against the vector database. This can include retrieving a threshold number of the closest vectors in the database. Again, closeness can be measured in a variety of different ways, such as by using a cosign function or measuring a distance between vectors. This set of closest vectors is referred to as the identified similar vectors.

At stage 455, the chunks associated with the identified similar vectors are then retrieved by the platform. To do this, the platform accesses metadata that is imbedded with the vectors. The metadata can specify a document, document location, and document portion associated with the chunk. Alternatively, or in addition, the metadata can include an index for the chunk portion, which is indexed and stored separately. The retrieved chunks can be referred to as identified similar chunks.

The indexing can be hash-based indexing, tree-based indexing, cluster-based indexing, or graph-based indexing.

At stage 460, the platform can identify an AI service, generate prompts, and submit identified similar chunks to the AI service for further processing. This was explained with regard to stages 135, 140, and 145 of FIG. 1A; stage 250 of FIG. 2; and stages 315, 320, 325, and 330 of FIG. 3, among other places. The prompts can define the scope of what is requested from the AI service. For example, the four most relevant identified similar chunks can be determined by the AI service. Citations and hyperlinks can be added to those chunks. And then the resulting information can be sent to the application for display in the GUI.

Figure 5A:
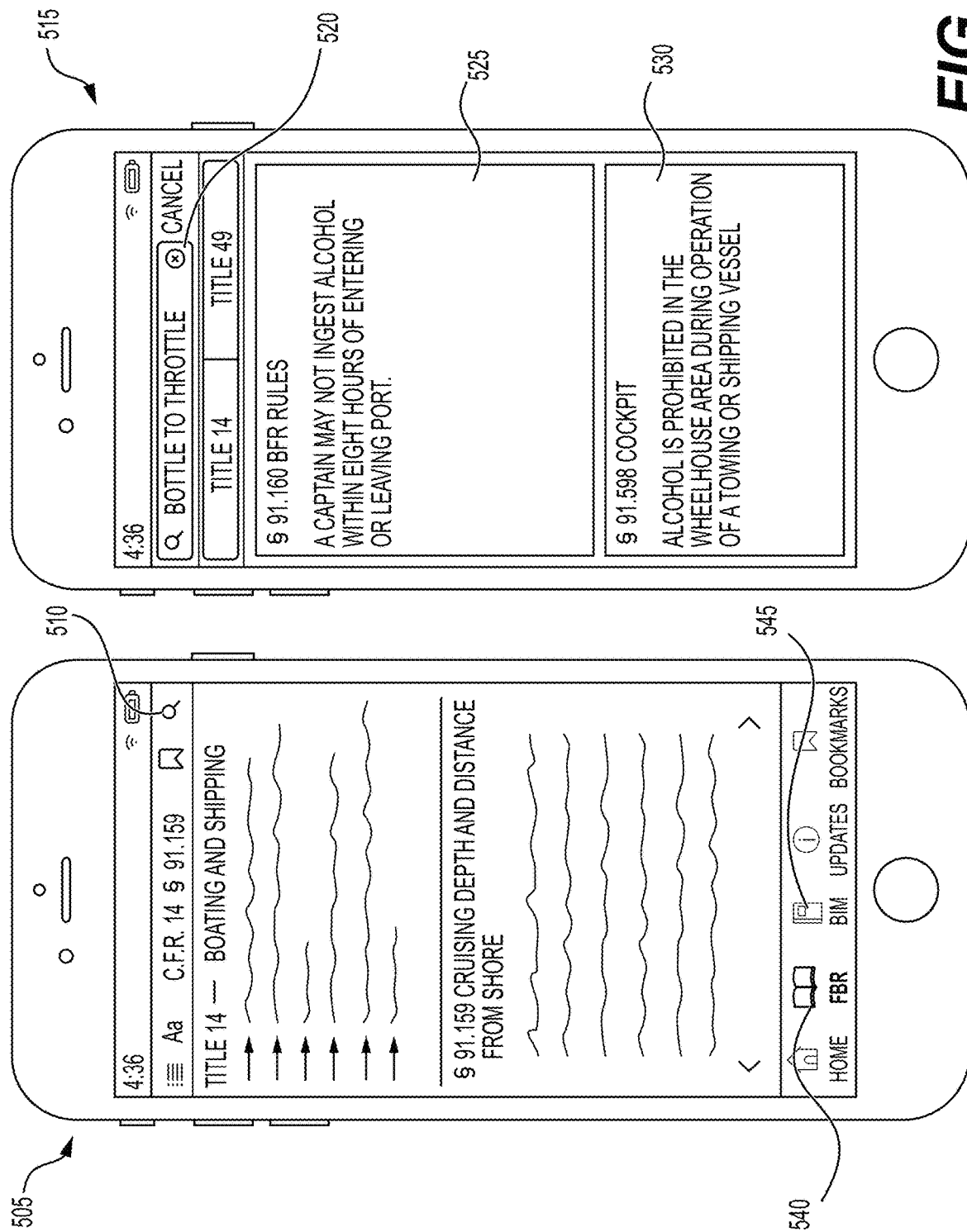
FIG. 5A is an illustration of an example user device and graphical user interface ("GUI") used for a multidimensional search within an application.

FIG. 5A is an illustration of an example user device and graphical user interface ("GUI") used for a multidimensional search within an application. Two views 505 and 515 of the user device are shown. In this example, the user device is a phone. But the examples apply to any processor-based device, such as a headset, laptop, tablet, or personal computer. Some of those other types of user devices are shown in FIGS. 5B-5F.

In the first view 505, an application is executing on the user device. As shown at the bottom of the user device, a first dataset 540 has been selected. The application shows text from that first dataset 540. In this example, the first dataset 540 FBR stands for Federal Boating Regulations. The user is presumably looking for information in those regulations.

A selectable second dataset 545 is also available. That dataset 545, labeled BIM, stands for Boating Information Manual. The application of this example helps pilots and other aviators quickly locate pertinent information.

As shown in the GUI in the first view 505, a search option 510 is available. The user can select the search option 510 and input a query.

The second view 515 shows an example search. In this example, the user has typed "bottle to throttle" in the search field 520. The saying "bottle to throttle" could be used in a boating or aviation context to refer to rules or guidelines dictating the minimum amount of time that must pass between a captain or pilot's last consumption of alcohol and the time they take control of a vessel or an aircraft. However, the words "bottle to throttle" do not appear in the Federal Boating Regulations or in the Boating Information Manual. As a result, a normal text search would fail to return any matches.

But in this example, the application has already received a pipeline endpoint and a key. The pipeline includes requesting additional context from an AI service. For example, an embedding model can vectorize "bottle to throttle" and compare the vector against a vector database for the selected first dataset 540. Then, the chunks related to the similar vectors of that comparison can be sent with prompts to a first AI service. The prompts can cause the AI service to return text that can be output as a matching search result to the application. An example pipeline will be discussed below with respect to FIG. 6A.

The endpoint, the dataset, and the AI service can be downloaded to run locally on the user device in an example. For example, when a captain is at sea or a pilot is flying, it can be advantageous for the entire pipeline to operate locally on the user device.

Another example pipeline could include sending the "bottle to throttle" query to an LLM. The LLM can explain what "bottle to throttle" means in a naval or aviation context or provide one or more keywords. That output can be appended as an additional search term or used as the only search terms. These search terms can then be vectorized by an embedding model. The explanation could be semantically very similar to an explanation in the Federal Aviation Regulations. As a result, a vector comparison with the vector database could return one or more very similar vectors that are then used to retrieve the relevant data chunks. Rather than receiving no results, the application could then display multiple results with citations, ranked by relevance.

The example of FIG. 5A shows two such results 525, 530. The first and most relevant result 525, states the actual rule that is colloquially referred to by "bottle to throttle." The result 525 can include a citation as well as a hyperlink so that the user can read the full section of the relevant regulations.

The second result 530 can be relevant, although less relevant than the first result 525. In this example, the second result relates to alcohol prohibition in the cockpit. Although this is not directly relevant, the semantic similarity was enough in this example to warrant display.

Figure 5B:
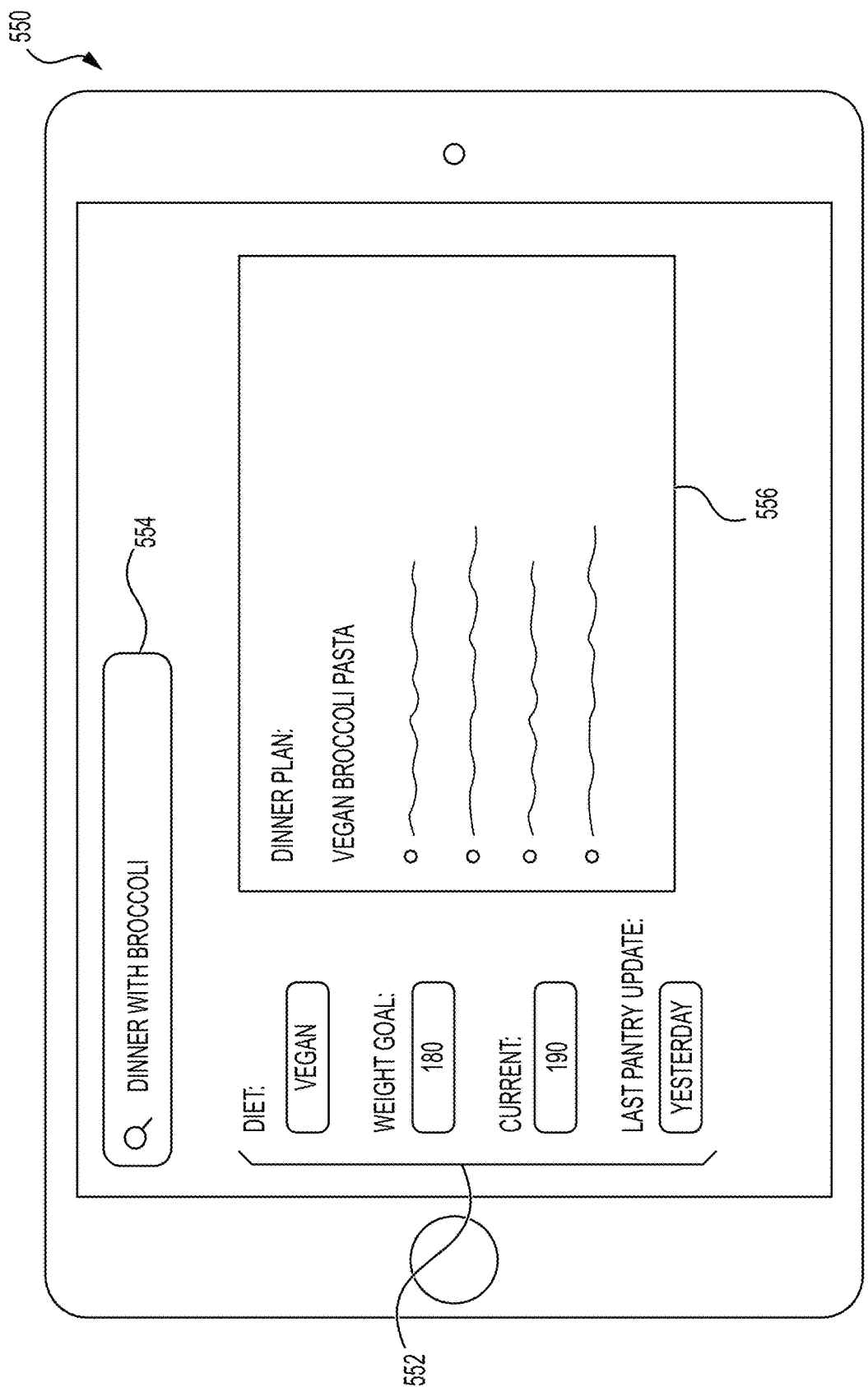
FIG. 5B is an illustration of an example user device and GUI used for a multidimensional search within an application.

FIG. 5B is an illustration of an example user device and graphical user interface ("GUI") used for a multidimensional search within an application. In this example, the user device 550 is a tablet. The application shown on screen is a health and wellness application, using the multidimensional search functionality for recommending a dinner plan. As inputs 552, the application takes in a diet type, in this case Vegan, a weight goal, a user's current weight, and a dataset corresponding to the user's pantry. In this case, the dataset is a day old.

At least one additional dataset is also utilized for various dinner plans, with caloric information and ingredient lists.

The user can initiate a query 554 by requesting "dinner with broccoli." The multidimensional search can then employ any of the pipelines described herein to suggest a meal that includes broccoli, helps the user towards their weight goal, and utilizes pantry items to an extent that could be specified in user settings. Preprocessing can determine a calorie range based on the closeness of the user to their weight goal, and whether they are above or below their weight goal. The preprocessing can utilize an LLM or other AI service, in an example.

The processed query can then be vectorized and compared against a vector database of meal plan information. The closest semantic matches can be identified, and the corresponding chunks of text retrieved. The results can then be sent to an LLM for organization, filtering, and further formatting. The post-processed results can then be displayed in pane 556. In this example, the results relate to a Vegan Broccoli Pasta meal.

Figure 5C:
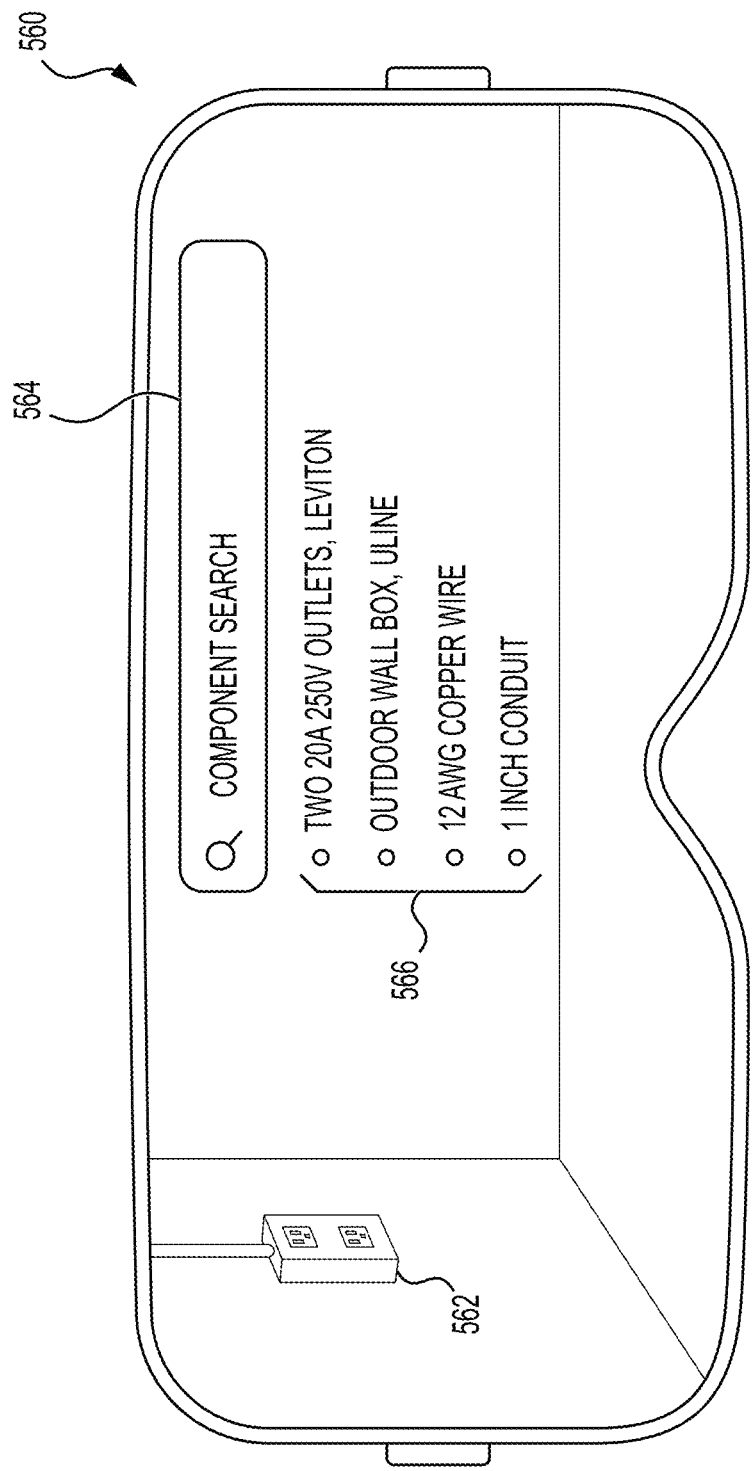
FIG. 5C is an illustration of an example user device and GUI used for a multidimensional search within an application.

FIG. 5C is an illustration of an example user device and graphical user interface ("GUI") used for a multidimensional search within an application. This example involves a headset user device being used to determine the components of an electrical assembly as part of a construction project. An image recognition model can be used to recognize the electrical assembly 562, which the user can be viewing in the field. Then a query 564 for a component search can be initiated. Identifying information for the electrical assembly 564 can be compared against a vector database of assemblies and parts that are used on the project or across many projects. Then, the results can be sent to an LLM, which can list the individual parts of the assembly in a format that is usable by the application for display in the headset 560. The results can then be displayed in an area 566 of the headset view.

Figure 5D:
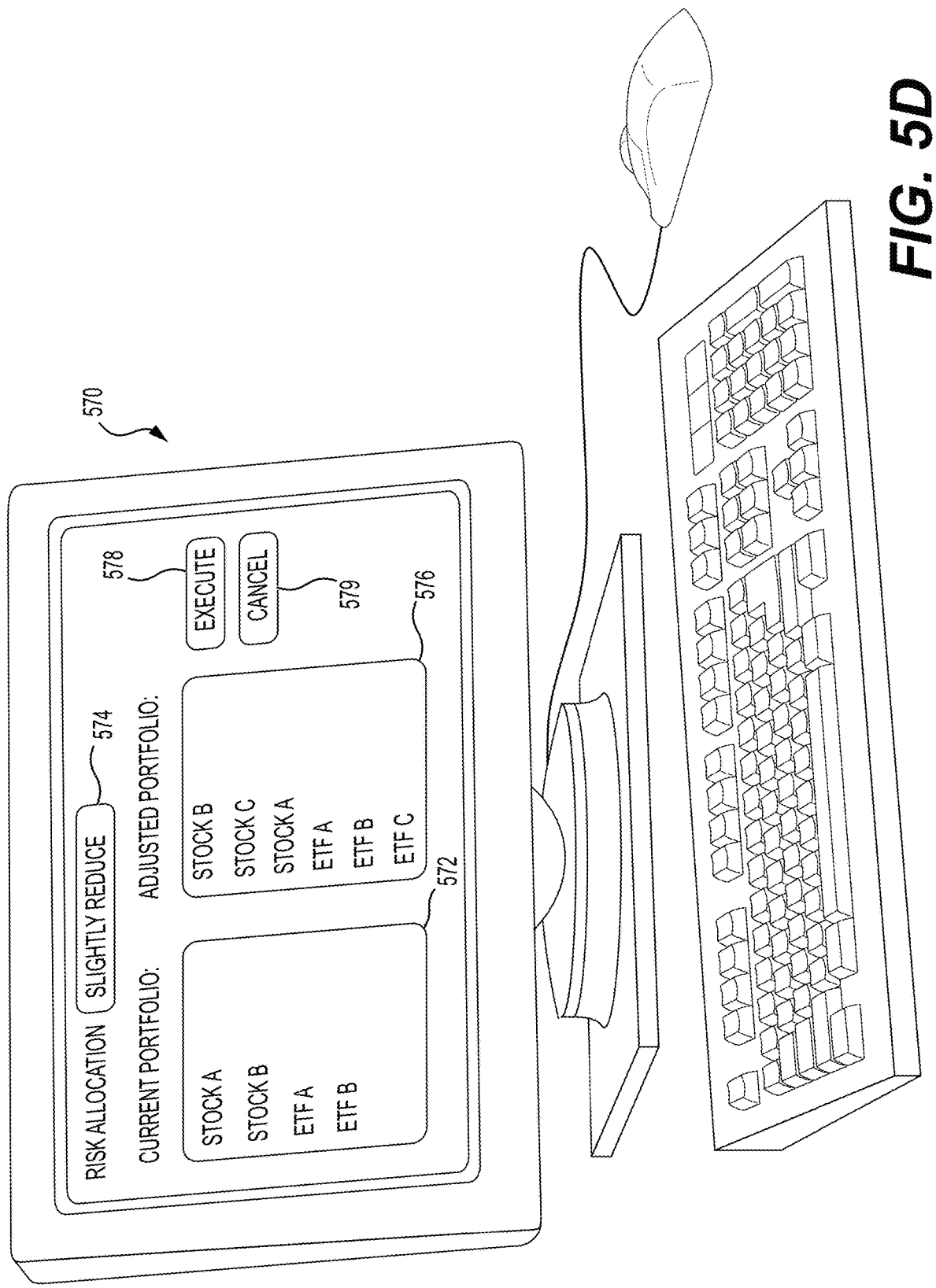
FIG. 5D is an illustration of an example user device and GUI used for a multidimensional search within an application.

FIG. 5D is an illustration of an example user device and graphical user interface ("GUI") used for a multidimensional search within an application. In this example, the user device is a personal computer. A financial application runs on the computer. In this case, the application allows for analyzing and reallocating an investment portfolio.

A current portfolio of a user or fund is shown on the screen at pane 572. The user can submit a query 574 to "slightly reduce" risk allocation of the portfolio. The current portfolio can be utilized as part of the query. The system can then perform a multidimensional search by vectorizing the current portfolio, comparing against a vector database of risk analysis for stocks and funds, and returning risk-correlated information for the current portfolio and related stocks and funds. This result can be sent to an LLM with a prompt package to limit the changes to the current portfolio in a way that meets the "slightly reduce" query criteria. The LLM can take into account many other factors, such as transaction fees and tax impacts, based on prompt packages and/or additional datasets. The LLM can output an adjusted portfolio that can be post-processed and displayed in pane 576. The GUI can also include an option to execute 578, which can automate the buys and sells needed to adjust the portfolio. Other options, such as cancel 579, can be used to decline the changes or to suggest a different allocation based on the same or similar query criteria.

A similar multidimensional search can be performed for a real estate application. For example, the application can take into account a geographic distribution of a user's or client's real estate holdings. The user might query how to diversify the risk of their portfolio. The identified datasets could include socioeconomic sources, real estate locations, and submarkets within a primary market that relates to the user's current real estate holdings.

The semantic meaning of the query can be determined and utilized to detect regions with different socioeconomics and trends than the current portfolio, yet still within the primary market. The data chunks related to those vector matches can be supplied to an LLM for purposes of formatting a summary of instructions for diversification, such as neighborhoods to invest in or even example properties for sale.

Figure 5E:
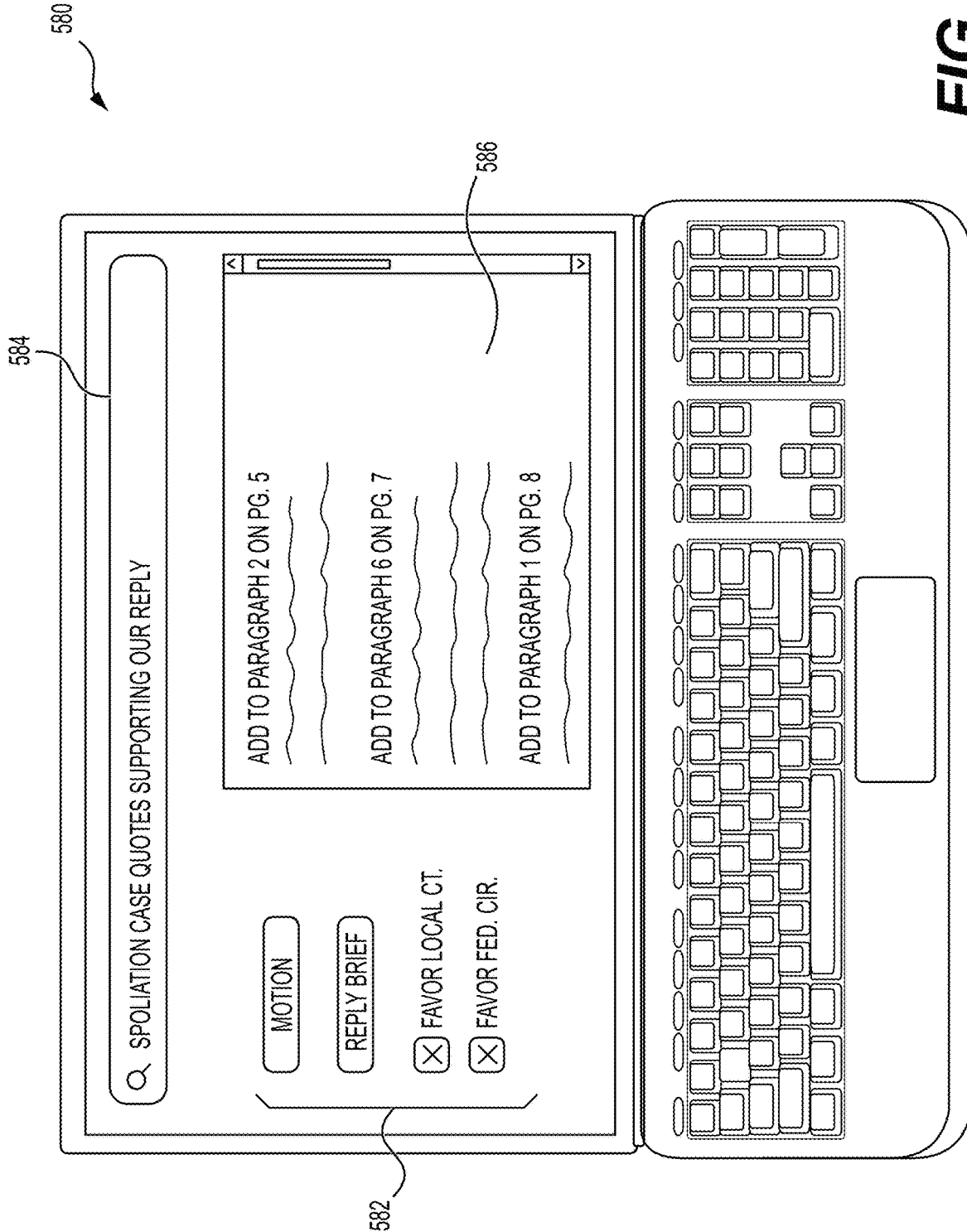
FIG. 5E is an illustration of an example user device and GUI used for a multidimensional search within an application.

FIG. 5E is an illustration of an example user device and graphical user interface ("GUI") used for a multidimensional search within an application. In this example, the user device is a laptop 580 and the application is a legal assistant. The application can help an attorney draft a brief, in this example by suggesting case citations that support a particular position an attorney is taking in a response to a motion.

AI pipeline inputs 582 can include the opponent's motion, the current draft reply brief, and various options regarding which types of cases the attorney prefers. The briefs can be treated as data sources that are used with an embedding model in a "Just In Time" processing manner, like branch 900 in FIG. 9. In the example of FIG. 5E, the attorney has made selections to favor local court cases and Federal Circuit cases. The attorney has also provided specific query instructions to look for "spoliation case quotes supporting our reply." In this example, pre-processing can include using an LLM to generate semantic meaning and relevant search terms that take all of these inputs into account. The inputs and LLM results can be vectorized and compared against relevant datasets of legal cases. The closest chunks can be returned.

Then the platform can send those chunks to another embedding model or an LLM for determining which ones are the most powerful, which can include recency (including in reference to corresponding cases in the original motion), similarity in fact patterns, and whether the case has been overruled or supported. An LLM can then prepare the holdings in a way that will fit into the Reply Brief, based on prompt packages and the Reply Brief itself. This output can be post-processed, and the formatted results can be displayed in a scrollable pane 586. Alternatively, the results can be added to the Reply Brief and highlighted, such as in a different color, and the user can select whether to select some or all of these changes.

Figure 5F:
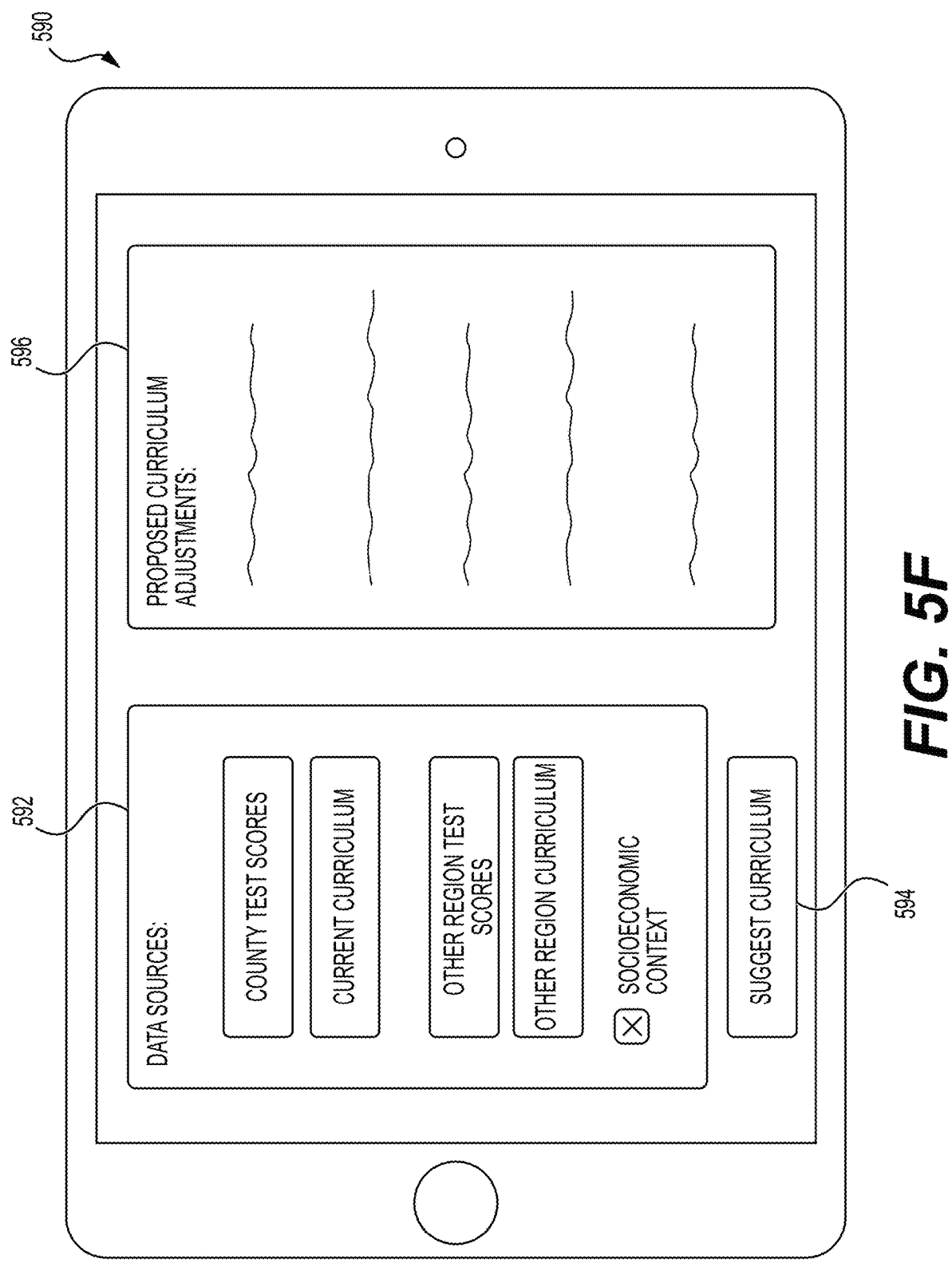
FIG. 5F is an illustration of an example user device and GUI used for a multidimensional search within an application.

FIG. 5F is an illustration of an example user device and graphical user interface ("GUI") used for a multidimensional search within an application. In this example, the user device is a tablet 590. The user can select various data sources 592, such as county test scores, current curriculum, other regional test scores (such as a state with high scores), and a corresponding other regional curriculum. Context can be selected, such as socioeconomic context of both regions.

The query can be initiated by selecting button 594, to suggest a curriculum. The data sources (i.e., datasets) can be vectorized and a query of prompt packages can be initiated. These prompts can be fed to an LLM, which then generates searches for determining differences between the curriculums that correspond to increased test scores in particular subjects and areas. The query can be vectorized and compared against the curriculum and score datasets. Resulting chunks can be fed to an LLM along with the other query information to return a proposed adjusted curriculum, which can be displayed in the application at pane 596.

A similar example can be provided for other industries, such as for performing market analysis in the real estate industry.

Figure 6A:
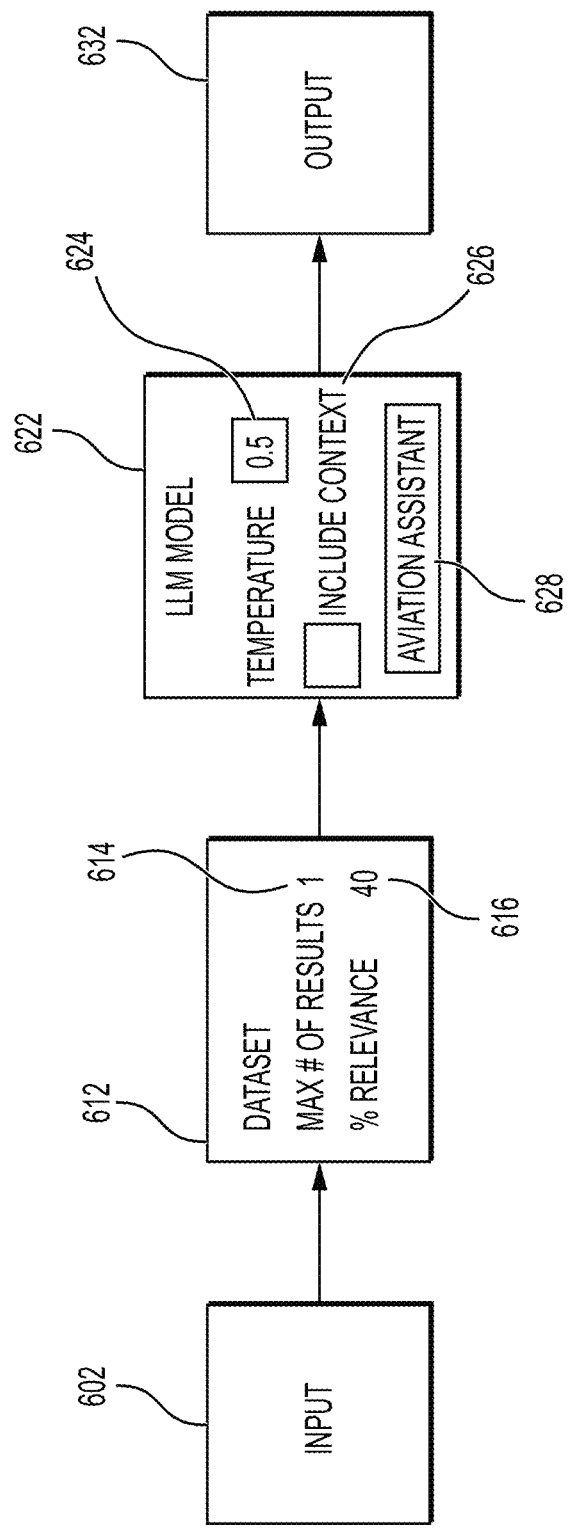
FIG. 6A is a flowchart of an example pipeline for searching a dataset.

FIG. 6A is a flowchart of an example pipeline for searching a dataset. The pipeline can be designed on the AI platform, such as on a GUI accessed by an administrative user. This AI platform, the GUI, and the management server can be synonymous with or utilize an AI pipeline management service. The AI pipeline management service can apply management functionality and provide a GUI for administrative setting of which management policies to apply to different users, groups, and pipeline objects. The administrative user can use the GUI to connect various pipeline objects between an input 602 and an output 632. These can include AI services, such as embedding models and LLMs, datasets used with embedding models, prompt packages, and code blocks. This can allow for designing custom pipelines that perform specific tasks for applications that connect to instantiated endpoints. When the pipeline has been designed, it can be deployed for operation in the cloud. Keys and endpoint locations can be distributed to a client server or directly to user devices for use with the installed applications.

In the example of FIG. 6A, the input 602 can represent the pipeline endpoint, which receives a query and a key. The key can authenticate the user, user device, and/or front-end application that is using the pipeline.

A dataset is identified at stage 612. The dataset can include various parameters set by policy, default, or by a user, such as an administrative user of the platform. In this example, the dataset policy is set to provide only one result with a maximum number of results parameter 614. A relevance parameter 616 dictates that the result must have a semantic relevance of at least 40%. In this example, the result with the highest semantic relevance will be returned so long as that relevance is greater than 40%. The result can be a vector with metadata that is used to identify the corresponding content chunk.

The next step in the pipeline, step 622, specifies using an AI service, in this case an LLM. A package of prompts called "Aviation Assistant" has been selected at stage 628. These prompts can be designed such that the LLM will return one or more results in a format that can be used by the application that submitted the query.

Other parameters are also available. In this example, the temperature 624 of the LLM is set to 0.5. Temperature 624 is a parameter that can control randomness in a model's output, and influences creativity and coherence. In this example, the temperature can range from zero to one, with 0.5 being a medium-to-low level. This will result in a more deterministic response from the LLM than would a higher temperature, such as 0.8.

Additionally, an option 626 to include context is not selected in this example. The context could include the identity of the user, for example. This can allow the LLM to incorporate user information into the response.

The results from the LLM can then move to the output 632 of the pipeline. The output can include some additional post-processing. The result can be returned to the application for display.

Figure 6B:
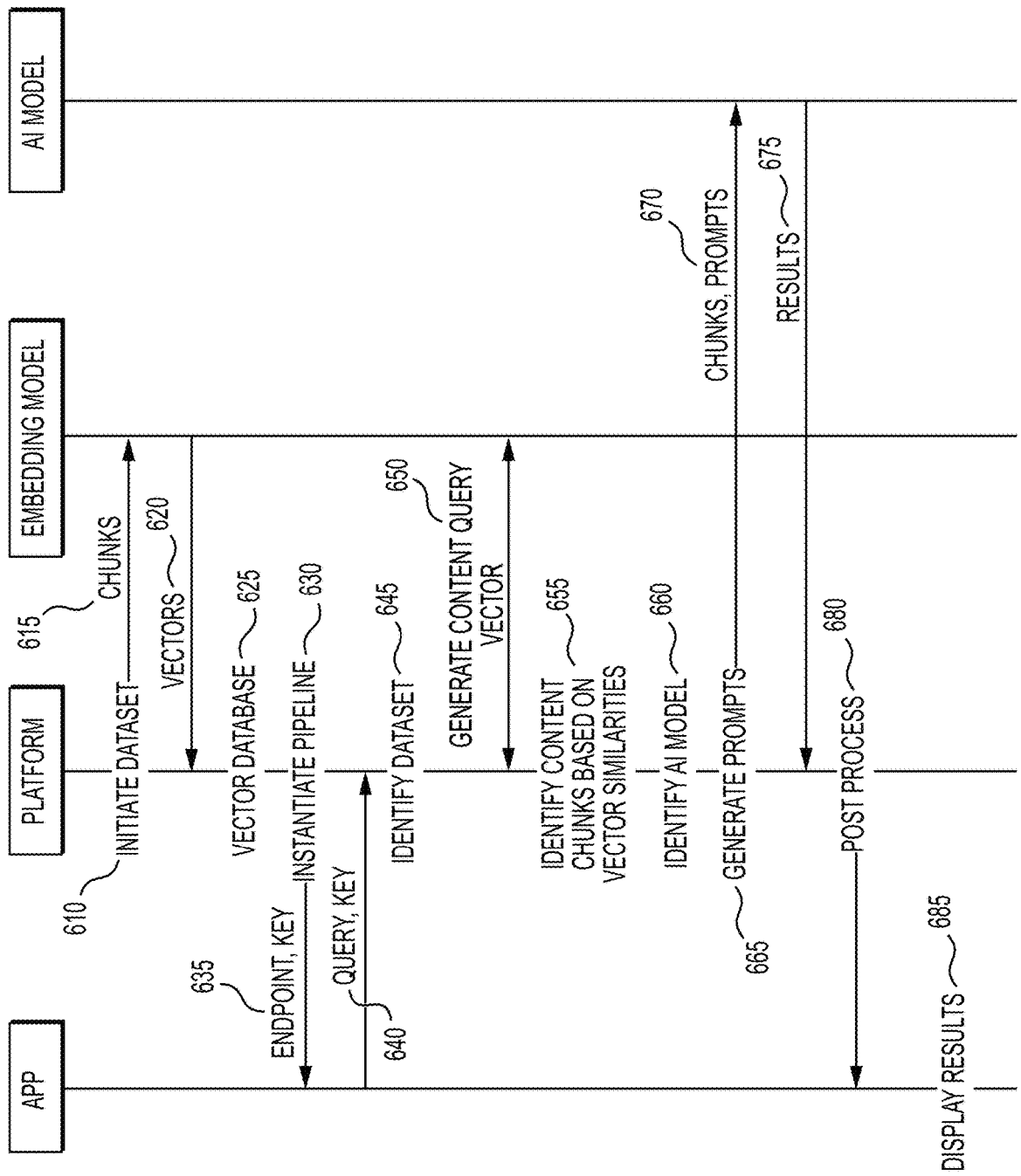
FIG. 6B is a sequence diagram of an example method for multidimensional searching within an application through use of managed AI systems.

FIG. 6B is a sequence diagram of an example method for multidimensional searching within an application through use of managed AI systems. The sequence diagram shows the stages can be spread across an application, AI platform (including a pipeline engine), an embedding model, and another AI model such as an LLM.

At stage 610, a dataset is initiated. This can occur prior to the pipeline being available for use, in an example. The dataset can be broken into chunks according to a dataset policy and chunking parameters. The chunks can be sent to an embedding model at stage 615.

The embedding model can create vectors and metadata from the chunks. These can be outputted and returned to the platform at stage 620.

The platform can use the vectors and metadata to create a vector database at stage 625. This can conclude the initialization of the dataset.

At stage 630, the platform can instantiate the pipeline. At stage 635, this can include sending an endpoint, such as a URL and a key, to an application that will use the pipeline.

When the application executes on the user device, the user can input a query. At stage 640, the query and the key can be sent to the pipeline endpoint. The platform can monitor calls to the endpoint if the endpoint is located in the cloud. Otherwise, the platform can deploy an agent for carrying out the pipeline locally on the user device.

At stage 645, the platform can identify the dataset as a target of the query. To search the dataset, the platform can chunk and send the query to the embedding model. At stage 650, the embedding model can vectorize the query.

At stage 655, the query vectors can be compared against the vector database created at stage 625. The closest vectors can be identified. These correlate to the content chunks that are most semantically similar to the query. These similar content chunks are identified at stage 655.

At stage 660, the platform can identify an AI model to use in preparing results that use the identified content chunks of stage 655. For that purpose, the platform can also generate prompts at stage 665. The prompts can include enterprise prompts or other pre-created prompts that shape the output of the AI model in a predictable way. This can allow the application to reliably use the output of the AI model.

At stage 670, the prompts and identified chunks are sent to the AI model. This can be done through an API call or with an SDK. The AI model performs according to the prompts and sends back results at stage 675.

At stage 680, the platform can then perform post-processing, ensuring that the results include content and format that is expected by the application. The processed results are then returned to the application.

At stage 685, the application displays those results.

Figure 7:
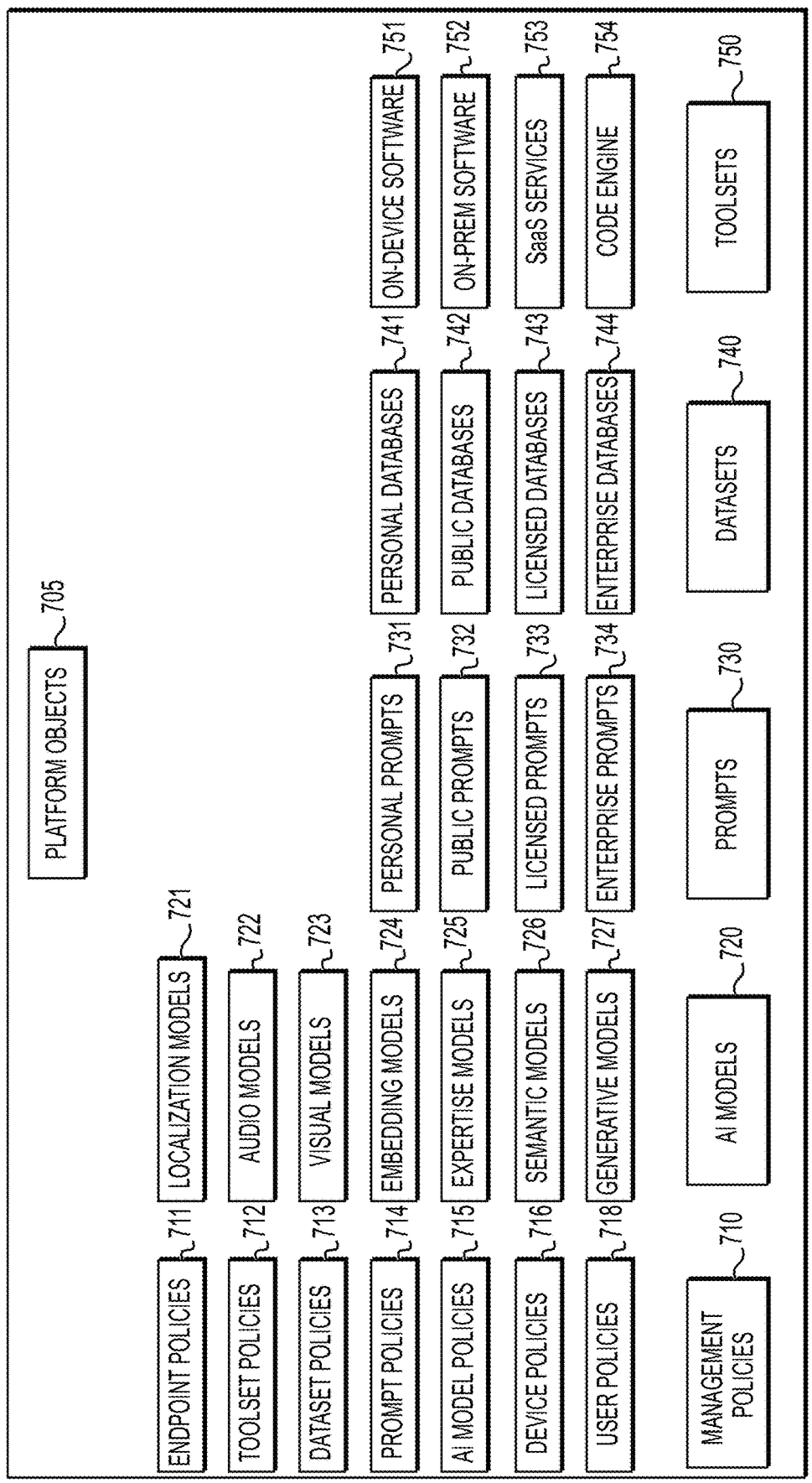
FIG. 7 is a system diagram of example platform objects present in an AI system.

FIG. 7 is a system diagram of example platform objects 705 present in an AI system. The platform itself can be distributed across one or more physical servers. The platform can execute in the cloud.

The objects 705 of the platform can be broken down primarily into management policies 710, AI models 720, prompts 730, datasets 740, and toolsets 750.

Management policies 710 can be used to control which datasets 740, AI models 720 (also referred to as AI services), prompts 730, toolsets 750, and parameters get used within a pipeline. The management policies 710 can be stored on a server and can relate to at least the aspects illustrated in FIG. 7. For example, user policies 717 can be specific to a user or a group of users. Device policies 716 can apply to specific devices or device types. AI model policies 715 can govern use of particular AI models 720. Prompt policies 714 can govern which prompts must be included and which ones are disallowed. Dataset policies 713 can control which datasets or portions of those datasets are available for use in the pipeline. Toolset policies 712 can govern what code and software is executable as part of a pipeline. And endpoint policies 711 can generally govern access and execution of the pipeline itself.

Various types of AI models 720 are available for use in a pipeline. Several types have been discussed above. Some of these types include localization models 721 that can execute on a user device or that can be specifically trained for the user. Audio models 722 can be used for analyzing audio. Visual models 723 can analyze visual data. Embedding models 724 can be used as described herein for vectorizing datasets and queries. Expertise models 725 can be trained on particular subject matter, such as aviation data. Semantic models 726 can be used to determine semantic meaning of data. And generative models 727 can generate additional content.

Prompts 730 can be generated based on stored prompt packages in an example. These stored prompts can include personal prompts 731 that are tailored to the user. Public prompts 732 can be those that any user can review. Licensed prompts 733 can be purchased and used in a pipeline. And enterprise prompts 734 can be specific to an enterprise, such as prompts that minimize messaging about a competitor.

The platform can also maintain datasets 740 for use in the pipelines. These can include personal datasets 741 that a user identifies. Public datasets 742 can be based on public documents or databases. Licensed datasets 743 can be paid for as part of usage within a pipeline. Enterprise datasets 744 can be proprietary to an enterprise.

Toolsets 750 can be used as additional code within a pipeline. This can be useful for pre- and post-processing, as well as for conditional analysis in a pipeline with multiple potential paths. The toolsets 750 can include on-device software 751, on-premises software 752, SaaS services 753, and a code engine 754. The toolsets 750 can include any compatible types of code or scripts. The code engine 754 can execute the code in coordination with the pipeline engine.

Figure 8:
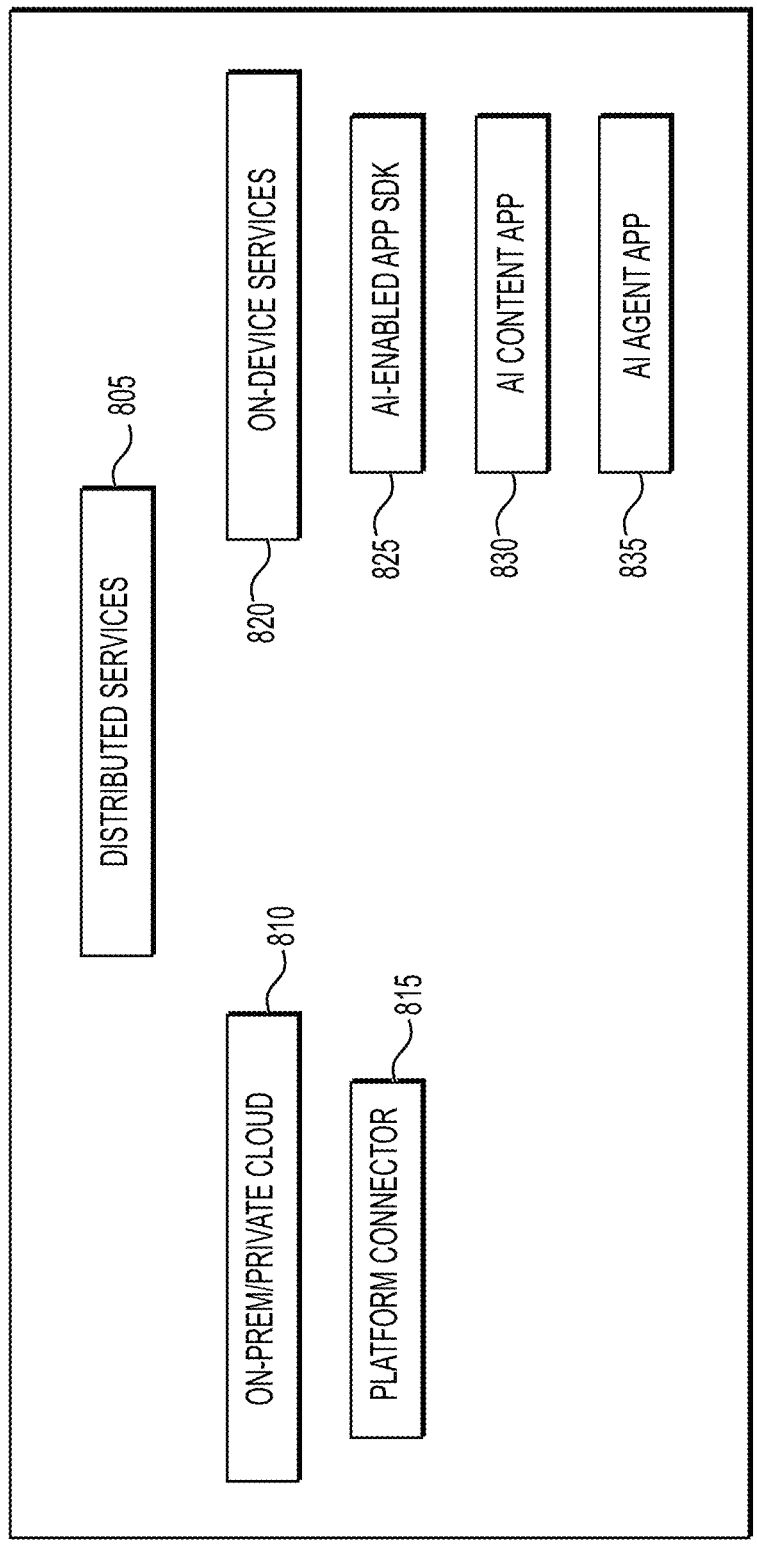
FIG. 8 is a diagram of example system components.

FIG. 8 is a diagram of example system components. The platform itself can be distributed 805 in a cloud or across a private network. On device services 820 can be those that execute on the user device. For example, an AI-enabled application SDK 825 can be part of an application that executes on the user device. An AI content application 830 can execute on the user device and allow for searching of documents and other datasets at a management server or on the user device. The AI content application 830 can leverage the SDK 825 for communicating with the platform connector 815, in an example. An AI agent application 835 can execute on the user device for orchestrating pipelines or portions of pipelines that execute locally on the user device. The AI agent application 835 (also called "AI agent") can be part of the content application 830 submitting the query or can execute independently of that application. The AI agent application A platform connector 815 can be provided for the user device to access endpoints and pipelines on a private or public cloud 810. The platform connector 815 can allow the platform to manage pipeline-related activities by communicating with the AI content application 830 or AI agent 835 on the user device.

Figure 9:
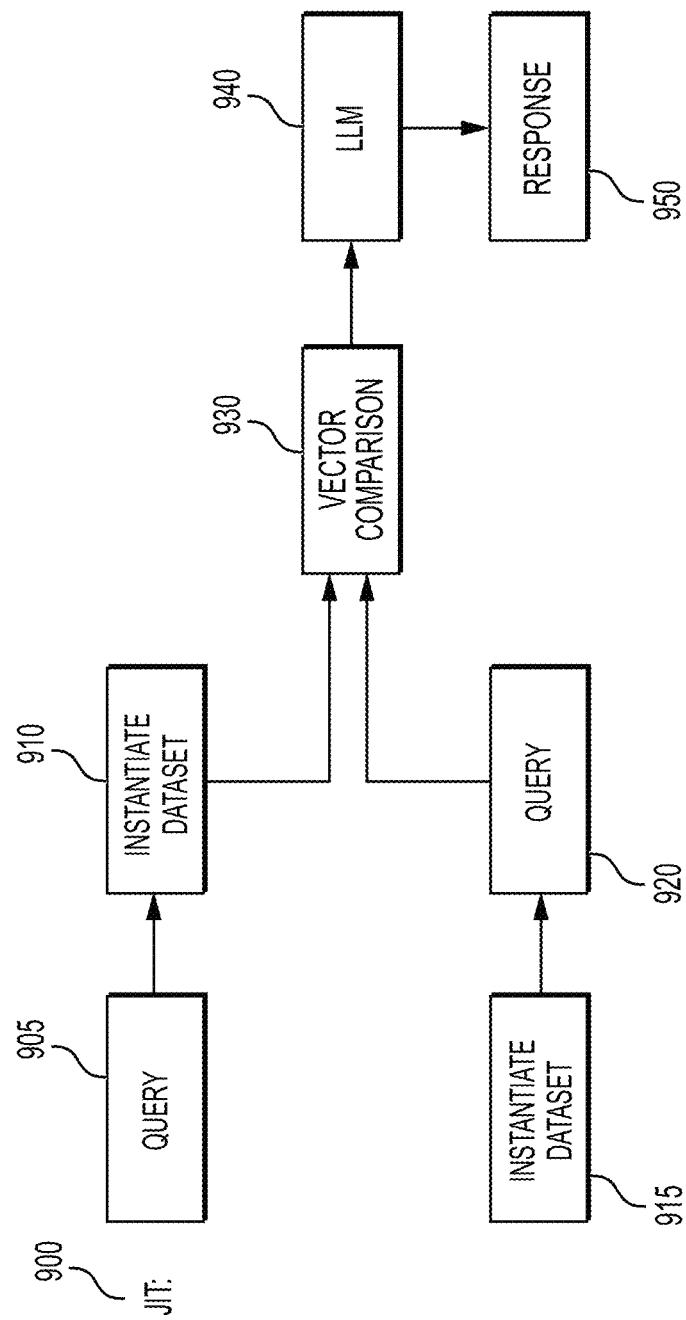
FIG. 9 is a flowchart of an example pipeline for searching a dataset.

FIG. 9 is a flowchart of an example pipeline for searching a dataset. This example shows how a dataset can be instantiated in a "just in time" fashion, such as when the identified dataset has not yet been vectorized into a corresponding vector database.

As shown, the platform can receive a query at stage 905. The query can identify a dataset that is not yet instantiated. This can mean that no vector database has been created yet for the dataset. For example, the dataset can be a document received by the platform as part of the query. Alternatively, a location can be provided for downloading the dataset. The platform can maintain unique identifiers for the document, such as based on the document name, size, and date of modification.

When the platform determines that the dataset is not yet instantiated, the platform can instantiate the dataset at stage 910. This can include preprocessing the dataset, such as ensuring that sensitive data is removed or encrypted and scanning the document for embedded prompts or other malicious code. The dataset can then be input into an embedding model. The specific embedding model can be selected based on management policies at the platform. For example, when speed is prioritized and the dataset is being used in a "just in time" ("JIT") context 900, the embedding model and parameters can prioritize speed over accuracy. This can result in a vector database with relatively fewer dimensions and vectors that summarize relatively larger blocks of text.

Conversely, a dataset can be instantiated at stage 915 before receiving relevant queries at stage 920. This can be the case when the pipeline is designed from the outset to utilize a particular dataset. The dataset can be instantiated at stage 915 prior to pipeline instantiation. This way, when the query is received at stage 920, a vector database will already exist for the dataset.

When the dataset is instantiated, the pipeline engine can perform a vector comparison at stage 930. This can include pre-processing the query in some way, such as by generating keywords with an LLM, locating a cached meaning or result based on the query, and appending this information to the query or replacing some part of the query with this information. The query can then be vectorized using the same embedding model and parameters as were used in creating the vector database. The query vectors can be compared to vectors in the vector database to determine the closest vectors. This can include traversing an indexed vector database, for example, and choosing the nearest N vectors, where N is a predefined number.

The pipeline engine or embedding model can identify the corresponding chunks for the N vectors. One or more of those chunks can be inputs to an AI service, such as an LLM model, at stage 940. This model 940 can execute as part of the platform or can be a third-party model. The specific model used can be based on management policies, such as user authorization based on a user profile, usage caps, speed requirements, and others.

A prompt package can specify formatting and additional requirements for the results. The prompt package can also indicate a required response speed in an example.

The AI service can return a response at stage 950, which can be post-processed by the AI engine. The post-processed response can then be displayed in the application at the user device.

Figure 10:
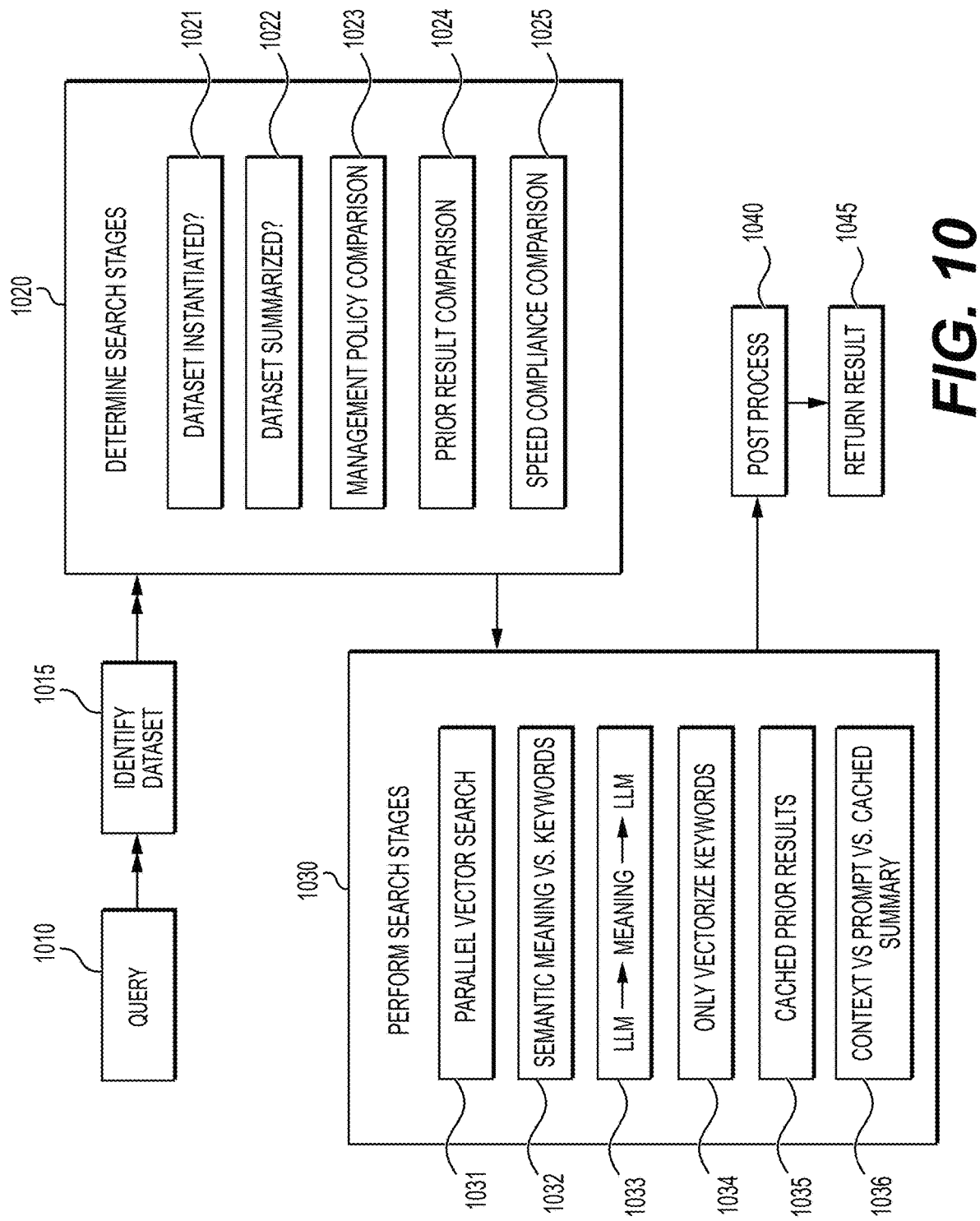
FIG. 10 is a flowchart of an example method for searching a dataset, including determining search stages for a conditional pipeline.

FIG. 10 is a flowchart of an example method for searching a dataset, including determining search stages for a conditional pipeline. This flowchart includes steps for determining which stages of a pipeline to incorporate. The stages can be selected based on management policies, prior results for similar queries, whether the dataset is already instantiated, and based on speed compliance. For example, the time it takes to provide results to a search can be important and can differ between applications. So, a particular pipeline can include a time limitation that causes the system to take different steps to comply with a desired operation speed.

In one example, a prompt can specify how long a particular AI model has to respond. The prompt can come from the application or can be part of the pipeline design. For example, an administrative user can select a dropdown in the design GUI that specifies "Time to respond," and select a desired value. This can allow for designing pipelines that prioritize speed over accuracy where warranted.

At stage 1010, the platform receives a query. The dataset can be identified at stage 1050. As part of this identification or separately, the pipeline engine can determine the pipeline stages (i.e., "search stages") at stage 1020. The pipeline itself can be dynamic in that the AI services or stages themselves can be selected or bypassed based on various criteria. The pipeline engine can determine if the dataset is initiated at stage 1021. If not, then the pipeline can make various adjustments to provide results in a timely fashion. For example, the pipeline can attempt to utilize a different version of the same dataset while the new dataset is instantiated in parallel in real time.

The pipeline engine can also check to see if the dataset has already been summarized at stage 1022. The summary can have been previously generated by an AI model and stored for access by the pipeline engine. This summary, rather than the entire dataset, can be passed to an AI service, such as an LLM, to speed up pipeline operation. This can improve operation speed even when the dataset has been instantiated in some examples.

At stage 1020, a management policy comparison can be part of deciding which pipeline stages to execute. For example, a user profile can include a credential that is sent to or accessed by the pipeline engine. The credential can indicate what AI models that user can access, or a cap on monthly or daily access by the user. Likewise, the user profile can include a speed setting where the user selects whether to prioritize accuracy or speed. This can influence which AI models are used or even the specific way in which the search is performed. For example, a quicker search can be done by generating keywords by an LLM, whereas a more accurate but slower search could include vectorizing the query plus keywords for a vector comparison using an embedding model. The speed preferences of the user profile can influence which of these steps to include. Additionally, the user device can execute local AI models that are faster yet less accurate than those available in the cloud. These can be utilized based on speed compliance.

The pipeline can make similar decisions based on a speed compliance comparison at stage 1025. The pipeline engine can keep historical records of how long searches are taking in various configurations of stages. In one example, different running average times can be recorded for the different individual stages. If a particular search configuration or stage is not meeting speed compliance requirements of an application, then the pipeline engine can attempt to use a different configuration or different stage within the configuration. The predicting times can be summed by the pipeline engine such that the default pipeline stages are temporarily changed to meet the speed compliance policy. Periodically, the original default pipeline configuration can be executed to see speed compliance is no longer an issue. An alert can also be surfaced at the platform for administrative users to check and test the pipeline for speed issues in various configurations and deploy corresponding changes to the default pipeline.

The pipeline engine can also perform a prior result comparison at stage 1024 in an attempt to recognize a query that has returned no results or took too much time to return results. In this case, a cached substitute query can be executed in place of the original query or in parallel to the original query. The results from the substitute query can be returned if no results or too much time is taken in the search for the original query.

At stage 1030, the combination of search steps selected in stage 1020 are performed. The scenarios 1031, 1032, 1033, 1034, 1035, and 1036 represent possible ways that the pipeline engine can configure the pipeline for execution to increase performance speed.

In scenario 1031, a parallel vector search is performed for the identified dataset. The vector database for the dataset can be divided into multiple parts for parallel searching. Preferably, this will have been done in advance by the pipeline engine based on administrative user command or based on detecting that a particular dataset is taking more than a threshold amount of time to search. One type of division is vertical sharding. Vertical sharding, also known as attribute-based partitioning, involves dividing the database by splitting the dataset into multiple parts based on different attributes or features. Vertical sharding can be applied to the vector database by splitting the vector space into distinct segments. The vector space can be divided into segments based on specific dimensions or ranges. For example, a 512-dimensional vector database can be split into two 256-dimensional segments, each stored on a different node. The nodes can be independently indexed. Indexing methods can include KD trees, hierarchical navigable small world ("HNSW"), and inverted file ("IVF"), which can speed up searches within each shard.

The search query can be split into sub-queries that correspond to each shard. The query vectors are split in the same way as the database vectors. Then the search can occur in parallel in each shard, taking advantage of parallel processing. The results can then be merged and aggregated to provide the final search result.

The sharded vector database can also be dynamically scaled by adding new dataset data to an additional shard.

Scenario 1032 can involve the pipeline engine deciding whether to use semantic meaning and keywords, semantic meaning alone, or just keywords as the query. For example, if the vector search is taking too long, the pipeline engine can use an LLM to pre-process the query to generate a summarized semantic meaning of less than a maximum number of words. In addition or alternatively, the LLM can be asked to generate X keywords, where X is a fixed number of keywords to search for. Then a combination of the summary and the keywords can be searched at the vector database. For example, vector search can include the summary only, keywords only, or both. This can save time over searching the entire query in some cases, such as if the query is long or references a large dataset. The dataset itself may be passed as part of the query, taking time to process.

Users (e.g., customers) can also choose their own vector databases in an example. The provider of the vector database platform can impact speed. A comparison of vector database search speeds and costs can determine which vector database is utilized. The vector database platform speeds can vary over time, and the platform or the user can elect to use a faster platform to increase speed.

Scenario 1033 includes utilizing an LLM to determine meaning of a query in preprocessing, then vectorizing and searching based on that determined meaning, and then using the LLM to format the results of the search. This approach is similar to the method of FIG. 1B, which can also include postprocessing with an LLM prior between stages 190 and 195. This approach can be chosen if the vector search of the query does not return adequate results. A failed vector search can be cached such that when similar queries are recognized at stage 1020 (such as in the prior result comparison at stage 1024), scenario 1033 can be employed to pre-process semantic meaning of the query. Alternatively, a cached semantic meaning can be utilized instead of requesting one from the LLM, such as in scenario 1035.

In scenario 1034, only keywords are vectorized rather than the entire semantic meaning or query. This can simplify and speed up the vector database comparison. The keywords themselves can be requested from an LLM. The LLM can be selected for speed or given a prompt with a maximum response time to ensure the keywords are generated quickly.

In scenario 1035, cached prior results can be used to bypass one or more pipeline stages. For example, queries can be cached at stage 1024 along with results. When a query is received at stage 1010 that matches a cached query, the cached results can be supplied. This can help eliminate processing expense involved in answering the same query repeatedly for either the same or different users. The cached query can expire in a predefined amount of time, such that results remain current, in an example. Alternatively, a date of the cached query can be compared to a date of the vector database to determine whether to utilize the associated cached data. If the cached query is more recent than the date of the vector database, the associated cached data can be utilized.

The cached data can include data chunks. Metadata of the chunks can be utilized for identifying the chunks without vectorization. For example, a flag in the metadata can correspond to a cache number, indicating that that chunk was a result of the cached search. This can allow the pipeline engine to retrieve the cached chunks without vectorizing the query, and then utilize the cached chunks with the LLM to format results as needed. In another example, the formatted results can also be cached for retrieval and use.

In this scenario, once the semantic meaning of the query is understood, subsequent queries can utilize the cached semantic meaning in more quickly generating results.

In scenario 1036, the pipeline engine can utilize a prompt package in place of query context. For example, rather than supplying the entire dataset to an LLM or embedding model, a corresponding prompt package for that dataset can be applied. These prompts can be designed to provide summary context of the dataset.

In one example, a cached summary of the dataset is utilized. For example, the pipeline engine can recognize that no summary exists yet for the dataset identified at stage 1015. The pipeline engine can create a summary by sending a prompt package and the dataset to an LLM for summarization purposes. This can be done separately or in parallel with the pipeline execution. The summary is then cached in reference to the dataset, which includes storing the summary in the cloud or in designated platform storage. Dataset metadata can be created to reference the summary. The next time the dataset is needed for query context, the pipeline can instead send the cached summary if the circumstances of stage 1020 dictate doing so.

At stage 1040, the results of the pipeline stages can be post processed. This can include formatting the results as needed for use by the application. At stage 1045, the results can be returned and utilized by the application, such as by displaying the results to the user.

Figure 11:
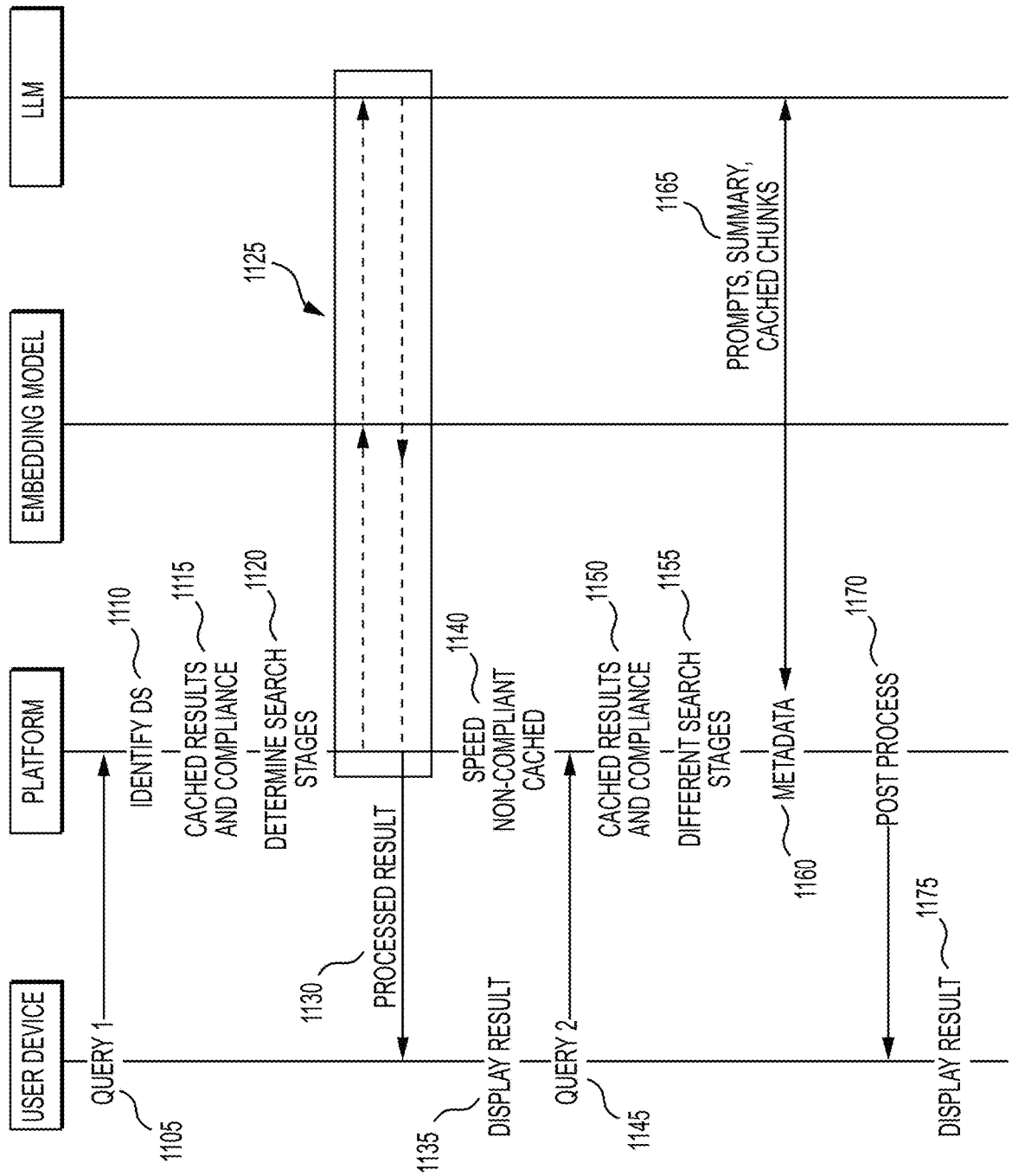
FIG. 11 is a sequence diagram of an example method for multidimensional searching in an AI system based on cached results and compliance.

FIG. 11 is a sequence diagram of an example method for multidimensional searching in an AI system based on cached results and compliance. This sequence diagram includes two queries. For the second query, the platform adjusts the pipeline stages in response to a non-compliant speed of a search corresponding to the first query.

At stage 1105, a first query is received at the pipeline endpoint. At stage 1110, the platform (via the pipeline engine) can identify a dataset implicated by the query. To determine what to do next, the pipeline engine can check management policies, user compliance, speed compliance, and cached results at stage 1115.

At stage 1120, based in part on the checks made at stage 1115, the compliance engine can determine which stages to implement in the search. The stages can be selected based on a conditional tree in one example. For example, the if the user is noncompliant with the management policies, the tree can specify local AI services that exist on the user device. Otherwise, the AI services available are expanded to those running on the platform or accessible via API by the platform. Based on speed requirements and the dataset(s) involved, AI services can be selected, and different prompt packages can be utilized. In short, the scenarios and stages described regarding stages 1020 and 1030 of FIG. 10 can apply to the determinations at stage 1120 of FIG. 11.

At stage 125, the search stages can be executed. This can include any of the scenarios and pipelines described herein. In one example, the query is vectorized by the same embedding model as used in vectorizing the dataset. And a vector search of the corresponding vector database results in a number of data chunks being identified. Those can be passed to an LLM with a prompt package for extracting and formatting text from the chunks in a way that is usable by the application making the query. After post-processing, a processed result can be sent to the user device at stage 1130. The application can then display the result on the user device at stage 1135.

The pipeline engine can also record the time it took to complete the search, including the time of each stage of the search. In this example, the pipeline engine can deem the search to be speed non-compliant—that is, the search took longer than policies for the application or the user specified. The times can be cached in connection for future use. The times can be cached in connection with the query, the dataset, or both.

At stage 1145, a second query can be received at the endpoint. This can be from the same or a different user. But in this example, the query is sent from the same application and utilizes the same endpoint or pipeline.

At stage 1150, the pipeline can check the cached results, management policies, and user compliance. The cached results can reveal that a similar query on the dataset was speed non-compliant. This can be based on the cached result of stage 1140, or an aggregation of such results that periodically occurs.

In response, at stage 1155, the pipeline can select a different configuration of stages to achieve a speed-compliant result. This can include bypassing or changing a stage that contributed most to the delays detected through aggregation or at stage 1140. For example, a scenario 1031-1036 of FIG. 10 can be implemented instead of the search pipeline at stage 1125 of FIG. 11.

In this example, at stage 1160, metadata indicates a semantic meaning for the query and relevant chunks of the dataset. The pipeline engine can utilize this metadata to skip use of the embedding model stages of the prior pipeline.

The pipeline engine can send the semantic meaning and cached data chunks to the LLM at stage 1165. The LLM can return results, which are post-processed at stage 1170.

The results can then be displayed at the user device at stage 1175. In this way, the pipeline engine can return accurate results in a speed-compliant manner through adjusting the dynamic search pipeline.

Figure 12:
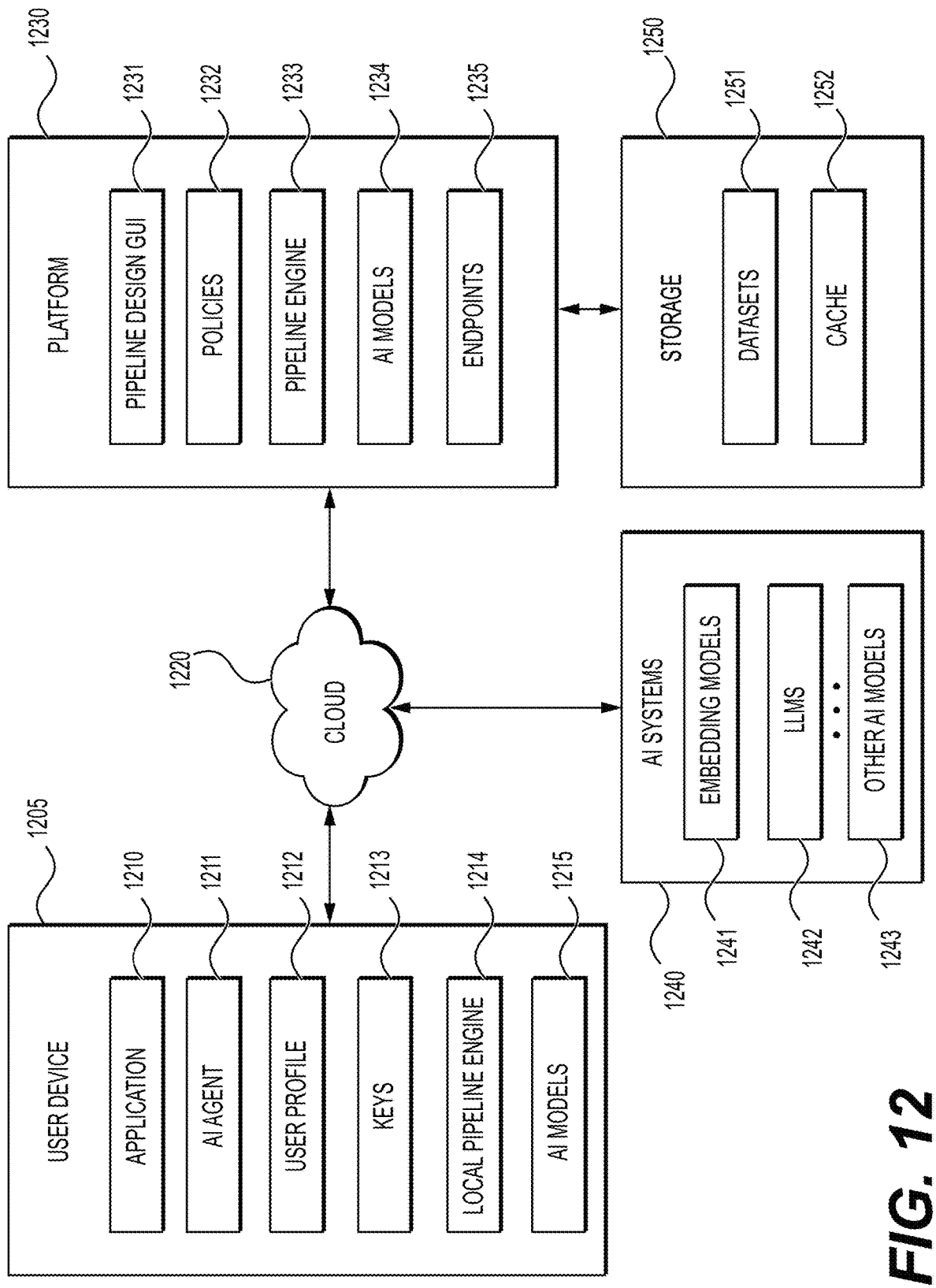
FIG. 12 is an example diagram of example system components.

FIG. 12 is an example diagram of example system components. This example is a high-level overview of interactions between a user device 1205, AI platform 1230, AI systems 1240, and cloud storage 1250. The user device 1205 can communicate with the platform 1230 over a network, such as the internet. Some or all of the platform 1230 can execute in the cloud 1220, across one or more servers. For example, pipeline endpoints 1235 can be deployed for execution in the cloud 1220.

As shown, a user device 1205 can connect to an endpoint 1235 over a network. The user device can be any processor-enabled device, such as a phone, laptop, tablet, or headset. An application 1210 (such as AI Content app 835 of FIG. 8) can execute on the user device 1205. The application can be configured to utilize an AI pipeline that is generated by the platform 1230.

In one example, the application 1210 enrolls with the platform and is assigned a user profile 1212. An AI agent 1211 (reference 835 of FIG. 8) can be provisioned from the platform 1230 to the user device 1205. The AI agent 1211 can monitor various device settings and ensure that the device 1205 is compliant with management policies 1232 at the platform 1230. The AI agent 1211 can execute separately from the application 1210 or be part of the application 1210, in different implementations.

When the application 1210 enrolls with the platform 1230, the platform can provide a URL to an endpoint location and an AI endpoint key for authenticating access when connecting to the pipeline. Other data can be provisioned to the user device 1205 by the platform 1230. For example, one or more datasets that are commonly used with the application 1210 can be downloaded independently or as part of the application. This can allow for local pipeline execution in some circumstances. For this purpose, a local pipeline engine 1214 can be installed on the user device. The local pipeline engine 1214 can be part of the AI agent 1211 or the application 1210 in an example. The role of the local pipeline engine 1214 is to manage dependencies of the local pipeline during localized execution. AI models 1215 can also be installed locally for use in the local pipeline execution. The AI models 1215 can include one or more embedding models and LLMs, for example. The local pipeline engine 1214 can manage inputs and outputs to these local AI models 1215 in an example.

The platform 1230 includes a GUI for designing pipelines. An administrative user can access the GUI and create new pipelines and edit existing pipelines. The stages of the pipelines can be presented onscreen, with models, datasets, prompts, code, and policies available for inclusion in a pipeline. Pipelines can be conditional as well, with different models and prompts utilized depending on a variety of factors. The factors include compliance with management policies 1232 (also 710 in FIG. 7). For example, particular models may have model policies 715 that dictate the number of uses per allotted time, the size of a dataset that can be used with the model, maximum number of input tokens (which can correlate to words or characters), and others.

User policies 718 can also be set such that different users have access to different AI models 1215, 1234. In one example, even local AI models 1215 can be managed such that a user must be part of an enterprise or some other group in order to access the AI model 1215. This way, if the user leaves the organization, an administrator can change the user's status, which causes the AI agent to update the user profile 1212 on the user device 1205. This can prevent, for example, an ex-employee from using a local enterprise AI model 1215 that is trained on enterprise data. Likewise, a dataset policy 713 can be attached to a particular dataset, requiring a particular user status from the user profile (such as employed, a particular group within a company, access level, etc.).

Speed policies 1232 can also be incorporated as conditions when designing an AI pipeline. If a result takes too long to retrieve from a vector search, then a faster but less accurate LLM can be used to prepare the result. Likewise, cached speed information can cause the pipeline to bypass or favor particular steps, as outlined with regard to FIG. 10. Additionally, when the user device 1205 is offline, the AI agent or local pipeline engine 1214 can specify using local AI models 1215 as described regarding FIG. 2. But if the device 1205 is online, then an online endpoint 1235 can be used to execute the remote pipeline, including platform AI models 1234 and those of third-party AI systems 1240. Alternatively, some stages can execute locally and others remotely in the cloud. The AI agent and the pipeline engine 1233 can communicate with one another remotely to manage such dependencies.

In short, the pipeline design GUI 1231 allows administrative users (associated with the platform 1230 or the application 1231) to create and change the AI pipelines used by applications 1210. When a pipeline is changed, a new endpoint 1235 and key 1213 can be supplied to the AI agent 1211 from the platform 1230 for use with the application 1210.

The platform 1230 can execute on one or more hardware servers. The platform can also utilize physical storage 1250 to store datasets 1251 and cached data 1252. The storage 1250 can be located in the cloud. The datasets 1251 can be vectorized into vector databases with corresponding data chunks. The chunks or the vectors can include metadata that the pipeline utilizes to link the vectors to the chunks. The metadata can also include flags that allow for chunk retrieval without a vector search, such as based on cached data 1252 for queries. Such queries may be overly time or processor intensive to repeat, as outlined with regard to FIGS. 10 and 11.

Once a pipeline is designed, it can be deployed at an endpoint 1235. The pipeline engine 1233 can manage execution of the pipeline at the endpoint 1235. This can include sending and receiving data to and from AI systems 1240. For example, some searches may require or benefit from embedding models 1241, LLMs 1242, or other AI models 1243 than those that are directly managed by the platform. The pipeline engine 1233 can supply necessary credentials, such as keys, to those AI systems 1240.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for controlling execution of artificial intelligence (AI) pipelines for semantic data retrieval through client applications, comprising:

receiving, at an AI pipeline endpoint, an AI endpoint key and an AI pipeline input from a client application that executes on a user device, the user device being associated with a user;

causing an AI pipeline execution engine to perform stages including:

identifying a dataset associated with the AI pipeline input;

based on a management policy, determining whether access to the dataset is authorized for a user submitting the AI pipeline input;

causing, based on the AI pipeline input, generation of input vectors with an embedding model, wherein dataset vectors in a vector database were also generated with the embedding model, and wherein the dataset vectors correspond to data chunks of the identified dataset;

causing identification of similar vectors based on comparing the input vectors to the dataset vectors of the vector database;

identifying the data chunks that correspond to the identified similar vectors;

identifying a first AI model for use with the AI pipeline input based on an object selection rule;

generating prompts for use with the first AI model, wherein at least one of the generated prompts relates to formatting specific to the client application;

transmitting the generated prompts and the identified data chunks to the first AI model; and receiving, from the first AI model, search results that correspond to the AI pipeline input;

adding a hyperlink to the search results, the hyperlink being generated based at least in part on a location of text that corresponds to the identified data chunks; and causing the search results to be displayed on a user interface provided by the client application.

2. The method of claim 1, wherein the prompts to the first AI model cause information to be removed from at least one of the identified data chunks, and wherein the prompts to the first AI model differ from prompts to a second AI model, wherein the first AI model is identified over the second AI model based on a management policy that applies to a group, wherein the user is associated with the group, and wherein the object selection rule includes at least one of monetary cost, compute performance cost, memory performance cost, and network component cost for using the first AI model.

3. The method of claim 1, wherein the generated prompts are different based on which of multiple datasets are selected within a user interface provided by the client application, wherein the identified dataset is one of the multiple datasets.

4. The method of claim 1, wherein identifying the dataset includes bypassing a second dataset based on a dataset policy indicating the second dataset requires an access credential not associated with the user.

5. The method of claim 1, further comprising creating the data chunks from the identified dataset based on chunking parameters, and wherein the chunking parameters are used in generating chunks of the AI pipeline input for vectorizing into the input vectors, and wherein the similar vectors include dataset vectors that are within a threshold distance or angle measurement to the input vectors.

6. The method of claim 1, further comprising determining which of multiple AI pipeline endpoints to use based on the online status of the user device, wherein the AI pipeline endpoint that receives the AI pipeline input is local to the user device, and wherein another AI pipeline endpoint is remote from the user device and accessed through a platform connector.

7. The method of claim 1, wherein the dataset is one of multiple datasets searchable within the client application, each of the multiple datasets having its own respective vector database.

8. The method of claim 7, wherein a local copy of the dataset is searched when an online copy of the dataset is not available.

9. The method of claim 1, wherein identifying the first AI model includes determining that the first AI model is accessible by a user group to which the user belongs.

10. The method of claim 1, wherein determining compliance with the object selection rule includes comparing the user's tracked usage of the first AI model against a maximum threshold, and wherein the maximum threshold is set in an AI pipeline management service based on selections received from an administrator user.

11. The method of claim 1, wherein identification of the dataset is based on information received with the AI pipeline input from the application, and wherein the dataset is vectorized and stored in the vector database prior to comparing the input vectors.

12. The method of claim 1, wherein identifying the dataset includes ruling out a second dataset based on the AI pipeline management profile indicating a second dataset requires an access credential that the user lacks.

13. The method of claim 1, wherein the AI pipeline endpoint and AI endpoint key sent to the user device is based on a user profile associated with the user device, and wherein different AI pipeline endpoints and AI endpoint keys are sent to other user devices for performing the search stages.

14. The method of claim 1, wherein the dataset is one of multiple datasets searchable within the client application, each of the multiple datasets having its own respective vector database.

15. The method of claim 1, further comprising transmitting, to the user device, a uniform resource locator (URL) and the AI pipeline endpoint key, wherein the URL corresponds to the AI pipeline endpoint and the AI pipeline endpoint key is used to verify that the user can access the AI pipeline.

16. A non-transitory, computer-readable medium containing instructions that, when executed by a hardware-based processor, causes the processor to perform stages for controlling execution of artificial intelligence (AI) pipelines for semantic data retrieval through client applications, the stages comprising:

receiving, at an AI pipeline endpoint, an AI endpoint key and an AI pipeline input from an application that executes on a user device, the user device being associated with a user;
causing an AI pipeline execution engine to perform search stages including:
identifying a dataset associated with the AI pipeline input;
based on a management policy, determining whether access to the dataset is authorized for a user submitting the AI pipeline input;
causing generation of input vectors with an embedding model, wherein the embedding model is selected based on having generated dataset vectors in a vector database, the dataset vectors corresponding to the identified dataset;
causing identification of similar vectors based on comparing the input vectors to the dataset vectors of the vector database, wherein the similar vectors include dataset vectors that are within a threshold distance or angle measurement to the input vectors;
identifying data chunks that correspond to the identified similar vectors;
identifying a first AI model for use with the AI pipeline input, including determining that user of the first AI model complies with an object selection rule that relates to compute performance cost, memory performance cost, or network component cost for using the first AI model;
generating prompts for use with the first AI model, wherein the prompts are generated based on the application and a user selection from the application;
transmitting the generated prompts and the identified data chunks to the first AI model; and
receiving, from the first AI model, search results that correspond to the AI pipeline input;
adding a hyperlink to the search results; and
causing display of the search results within the application.

17. The non-transitory, computer-readable medium of claim 16, wherein prompts are generated and sent to the first AI model based on stored prompts that are specific to the application and the first AI model.

18. The non-transitory, computer-readable medium of claim 16, wherein the similar vectors are stored with metadata for identifying security information relating to access of the data chunks that correspond to the similar vectors, and wherein the security information is compared against user policy information to determine whether at least one data chunk can be accessed by the user and sent to the first AI model.

19. The non-transitory, computer-readable medium of claim 16, wherein the dataset is one of multiple datasets searchable within the application, and wherein the dataset is identified based on the AI pipeline input.

20. A system for controlling execution of artificial intelligence (AI) pipelines for semantic data retrieval through client applications, comprising:

a memory storage including a non-transitory, computer-readable medium comprising instructions; and
at least one hardware-based processor that executes the instructions to carry out stages comprising:
receiving, at an AI pipeline endpoint, an AI endpoint key and an AI pipeline input from a client application that executes on a user device, the user device being associated with a user;

identifying a dataset associated with the AI pipeline input;
based on a management policy, determining whether access to the dataset is authorized for a user submitting the AI pipeline input;
causing generation of input vectors with an embedding model, wherein the embedding model is selected based on having generated dataset vectors in a vector database, the dataset vectors corresponding to the identified dataset;
causing identification of similar vectors based on comparing the input vectors to the dataset vectors of the vector database, wherein the similar vectors include dataset vectors that are within a threshold distance or angle measurement to the AI pipeline input vectors;
identifying data chunks that correspond to the identified similar vectors;
identifying an AI model for use with the AI pipeline input, including determining that user of the AI model complies with an object selection rule that is based on user information and cost or performance thresholds of the AI model;
generating prompts for use with the AI model, wherein the prompts are generated based on the application and a user selection from the application;
transmitting the generated prompts and the identified data chunks to the AI model; and
receiving, from the first AI model, search results that correspond to the AI pipeline input;
adding a hyperlink to the search results; and
causing display of the search results within the client application.

* * * * *